United States Patent [19]
Kagawa

[11] Patent Number: 5,278,424
[45] Date of Patent: Jan. 11, 1994

[54] APPARATUS AND METHOD FOR CORRECTING AN OFFSET VALUE CONTAINED IN AN OUTPUT OF A TURNING ANGULAR VELOCITY SENSOR

[75] Inventor: Kouji Kagawa, Osaka, Japan

[73] Assignee: Sumitomo Electric Industries, Ltd., Osaka, Japan

[21] Appl. No.: 978,968

[22] Filed: Nov. 20, 1992

[30] Foreign Application Priority Data

Feb. 10, 1992 [JP] Japan .................. 4-024064

[51] Int. Cl.⁵ .................................. G01V 9/04
[52] U.S. Cl. .................. 250/561; 364/450; 340/995
[58] Field of Search .......... 250/561, 231.12, 557; 364/450, 443, 444, 449, 457, 157; 340/995, 998, 990; 358/103; 73/504

[56] References Cited

U.S. PATENT DOCUMENTS

| | | | |
|---|---|---|---|
| 4,890,233 | 12/1989 | Ando et al. ............... | 364/457 |
| 5,072,396 | 12/1991 | Fitzpatrick et al. ........ | 364/450 |
| 5,119,301 | 6/1992 | Shimizu et al. ............ | 364/450 |

FOREIGN PATENT DOCUMENTS 0366249  2/1990  European Pat. Off. .

OTHER PUBLICATIONS

Patent Abstracts of Japan, vol. 12, No. 359 (P-762) Sep. 27, 1988 & JP-A-63 109 315 (Pioneer Electronic Corp.) May 14, 1988.

Patent Abstracts of Japan, vol. 15, No. 451 (P-1276) Nov. 15, 1991 & JP-A-31 91 812 (Sumitomo Electric Ind. Ltd.) Aug. 21, 1991.

*Primary Examiner*—David C. Nelms
*Assistant Examiner*—Que T. Le
*Attorney, Agent, or Firm*—Lane, Aitken & McCann

[57] ABSTRACT

A heading of a vehicle is detected by correcting an output of a gyro with an offset value stored in an offset memory. A location detecting unit estimates a current location of the vehicle by dead reckoning. When the vehicle continues to travel over a predetermined period of time, the headings of links before and after the current location of the vehicle are read out of a road map memory, and a difference between the two link headings is detected as a first heading change amount. The location detecting unit accumulates outputs of the gyro obtained during a period corresponding to the first heading change amount after the offset correction, and this accumulated value is detected as a second heading change amount. Based on the first and second heading change amounts, a new offset value is calculated. This new offset value is stored in the offset memory.

12 Claims, 14 Drawing Sheets

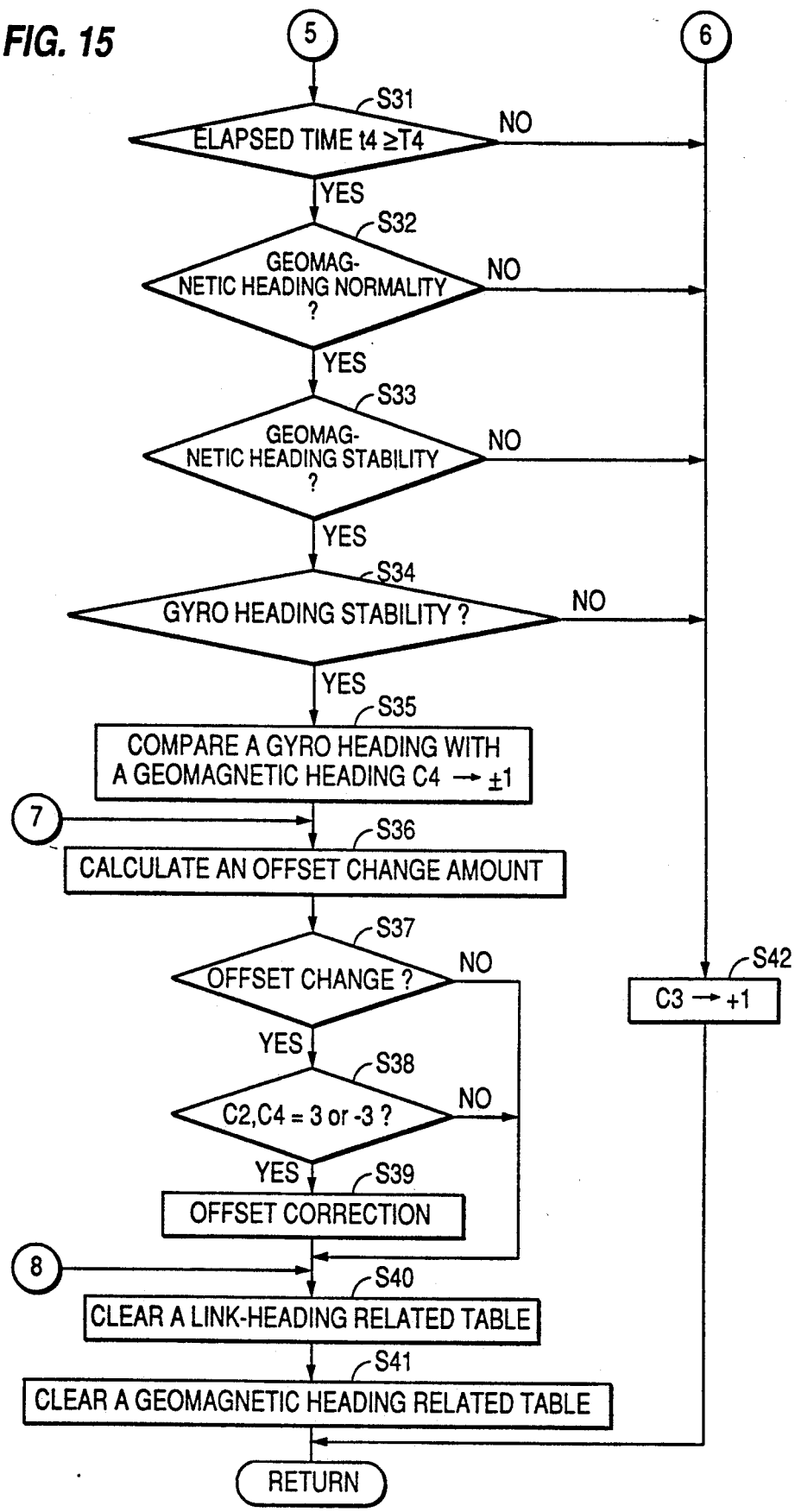

APPARATUS AND METHOD FOR CORRECTING AN OFFSET VALUE CONTAINED IN AN OUTPUT OF A TURNING ANGULAR VELOCITY SENSOR

FIELD OF THE INVENTION

The present invention relates to an apparatus and method for correcting an offset value that is contained in an output of a turning angular velocity sensor, such as optical fiber gyros, mechanical type gyros, vibration gyros, and gas rate gyros.

DESCRIPTION OF THE PRIOR ART

A turning angular velocity sensor such as a gyro has been used widely in a vehicle for sensing a predetermined heading of the vehicle such as a current heading. Output signals from the turning angular velocity sensor are processed, a heading change amount $\delta\theta$ that occurs upon movement of the vehicle is calculated very predetermined sampling period, and then current heading data of the vehicle are obtained. The current heading $\theta$ of the vehicle is calculated by the following equation (1):

$$\theta = \theta_0 + \delta\theta \qquad (1)$$

where $\delta\theta$ is the last heading change amount and $\delta_0$ is a heading obtained at the time of sampling of the heading change amount $\delta\theta$.

The current heading $\theta$ obtained in this manner is used to calculate the current location of a vehicle. That is, on the basis of the current heading $\theta$ and a travel distance $\delta L$ obtained, for example, from the output of a wheel sensor, the east-west directional component $\delta x$ ($=\delta L \times \cos\theta$) and south-north directional component $\delta y$ ($=\delta L \times \sin\theta$) of the travel distance $\delta L$ are calculated. The current location data (Px, Py) of the vehicle is obtained by adding the calculated directional components $\delta x$ and $\delta y$ to the previous location data (Px', Py'). This location detecting technique is called dead reckoning.

However, the turning angular velocity sensor tends to generate an offset output due to the influence of temperature or humidity, even when the sensor output should be zero during the time the vehicle is in its stopped state or its straight traveling state. This offset output cannot be removed even if detection is made for a sufficiently longer period of time, unlike noise components produced due to vehicle vibrations. The offset output is therefore accumulated with time. If the offset output is accumulated, a larger error will be contained in a detected current heading $\theta$, so the current location of a vehicle will be detected inaccurately.

In order to overcome the accumulation of the offset output, there has been proposed a method in which a current heading $\theta$ is detected by subtracting the offset output from the sensor output. For example, Japanese patent publication 58-39360 discloses a technique in which the output of a turning angular velocity sensor during the time a vehicle is in its stopped state is used as an offset value. That is, an offset value is detected from the output of the turning angular velocity sensor obtained during the time the vehicle is at a stop, and offset correction is made by subtracting the detected offset value from the output of the turning angular velocity sensor obtained during the time the vehicle travels. Japanese patent laid-open publication 63-182519 also discloses a technique in which a similar offset correction is made by using the output of a turning angular velocity sensor obtained during straight traveling. In this disclosed technique, if a road being traveled by a vehicle is identified as a straight road by using road map data, then an offset value is detected on the basis of an turning angular velocity sensor output obtained during straight traveling.

However, the offset of the turning angular velocity sensor tends to drift due to a change of temperature and humidity independently of whether the vehicle is in its stopped state or traveling state. Therefore, even if the turning angular velocity sensor output during traveling is corrected with an offset value obtained during stop or during straight traveling, a value after the offset correction will contains errors because of the aforementioned drift.

The technique disclosed in the aforementioned Japanese patent publication 58-39360 has the following disadvantages. In a case where a vehicle stops frequently or a vehicle travels a straight road frequently, the aforementioned problem will not arise very often because an offset value can be updated before the drift of the turning angular velocity sensor becomes large. However, in a case where a vehicle stops after traveling for a long period of time, for example, where a vehicle travels a freeway, the aforementioned drift becomes large and a detected heading becomes inaccurate, so that the current location of a vehicle is also detected inaccurately.

The technique disclosed in the aforementioned Japanese patent laid-open publication 63-182519 also has the following disadvantages, because a road being traveled by a vehicle is specified by road map information and because, if a road being traveled is a straight road of above a predetermined distance, it is determined to be a straight road. That is, in a case where a vehicle travels a road full of turns and twists, such as a mountain road, for a long period of time, and where a road being traveled by a vehicle cannot be specified by map matching, the offset correction of the turning angular velocity cannot be made during traveling.

It is, accordingly, an object of the present invention to make an accurate heading detection possible by making an offset correction appropriately.

SUMMARY OF THE INVENTION

The basic structure of a heading detecting apparatus according to the present invention is shown in FIG. 1. The heading detecting apparatus is mounted in a moving body such as a vehicle, ship and aircraft, and is used for detecting a heading of the moving body. The heading detecting apparatus comprises a turning angular velocity sensor 21 for sensing a turning angular velocity of the moving body, and correction means 22 for correcting an offset contained in an output of the turning angular velocity 21. The heading of the moving body is detected on the basis of an output of the correction means 22.

The offset contained in the output of the turning angular velocity sensor 21 varies with time due to the influence of temperature and humidity. Therefore, an offset value that is a correction value in the correction value means 22 is updated by offset updating means 23.

In order to update the offset value, there are provided location detecting means 24 and a map memory 25. The location detecting means 24 detects a current location of the moving body. The map memory 25 stores links that are interconnected by nodes representative of predetermined coordinate positions on a map and correspond to paths that the moving body may travel, and also stores link headings of the links along which the moving body travels. The current location of the moving body can be detected by dead reckoning, based on the output of the turning angular velocity 21 that is offset corrected by the correcting means 22 and on the output of a speed sensor for sensing a speed of the moving body. The current location of the moving body can also be detected by measuring a propagation delay time of the wave transmitted from a GPS (Global Positioning System) satellite.

The information about the current location detected by the location detecting means 24 is fed to first determination means 27. The first determination means 27 calculates a correlation between a track of the detected current location and a link stored in the map memory 25 and determines the correlation as a matching state when the correlation is in the predetermined correlation. That is, when the detected current location well matches with a link stored in the map memory 25, a correlation between the current location and the link is determined as a matching state. The link heading of the link corresponding to the current location of the moving body as the matching state was determined is stored as a first heading in first storing means 31.

There is provided second determination means 28 for determining whether a moving body is in a traveling state or in a stopped state. The result of the determination is fed to the offset updating means 23 and also to travel-time measuring means 29 that measures the continuous-travel time of the moving body. The determination result is also fed to the travel-time measuring means 29. The travel-time measuring means 29 starts measuring after the first heading has been stored in the first storing means 31, and continues to measure the travel time of the moving body during the time that the moving body is in a traveling state and that the matching state has been determined by the first determination means 27. If the measured travel time becomes a predetermined time, then a writing command is fed through a line 30 to second storing means 32. In response to the writing command, the second storing means 32 stores a link heading of a link corresponding to the current location detected at that time, as a second heading.

When the moving body stopped before the predetermined time or when the aforementioned correlation is no longer in a matching state, the time measured by the travel-time measuring means 29 is reset.

It is noted that the first memory means 31 and the second memory means 32 may be constituted separately by separate memory elements, or they may be constituted by a single memory element having separate memory regions.

The first and second headings stored respectively in the first and second storing means 31 and 32 are fed to first detecting means 41, which detects a first heading change amount from the first and second headings. For example, the first heading change amount is obtained from a difference between the first and second headings.

On the other hand, the output of the correction means 22 is fed to second detecting means 42, which detects a second heading change amount corresponding to the first heading change amount by accumulating the output of the correction means 22. That is, the second detecting means 42 start accumulating the output of the correction means, when the first heading is stored in the first storing means 31, and the accumulation is stopped when the second heading is stored in the second storing means 32. The accumulated value at that time is fed as a second heading change amount to the offset updating means 23. Since the output of the correction means 22 is an output of the turning angular velocity sensor 21 obtained after the offset correction, the accumulated value is a heading change amount.

The offset updating means 23 calculates a new offset value on the basis of the first and second heading change amounts. The first heading change amount is obtained based on the link heading in the matching state, so it becomes a value extremely close to an actual value. On the other hand, the second heading change amount is an accumulated value of the output of the turning angular velocity sensor 21 obtained after the offset correction, so a drift amount of the offset produced during traveling is accumulated. Therefore, an accumulated value of the offset drift amounts is obtained by subtracting the first heading change amount from the second heading change amount. If the offset drift amount is obtained from the accumulated value, a new offset value can be obtained based on the offset drift amount. This new offset value is fed through a line 35 to the correction means 22. After the update of an offset value, the data stored in the first and second storing means 31 and 32 are cleared in response to a signal from a line 37.

It is noted that, in the second detecting means 42, the output of the turning angular velocity sensor 21 before the offset correction may also be accumulated. In that case, the second heading change amount to be detected is a total of an actual heading change amount and an accumulated value of offsets containing the offset drift amount. Therefore, for example, by subtracting the first heading change amount from the second heading change amount, the accumulated value of offsets containing the offset drift amount is obtained, so a new offset value can be obtained based on the accumulated value.

The accumulated value in the second detecting means 41 is a value accumulated over a predetermined time measured by the travel-time measuring means 29, so noise components other than the offset drift amount are offset by a long period of accumulation. By this, an offset value can be obtained accurately.

When it is determined by the second determination means 28 that a moving body is in its stopped state, an offset value can be updated in the offset updating means 23 on the basis of the output of the correction means 22 fed through the line 36. That is, since the output of the correction means 22 as the moving body is in the stopped state is an offset drift amount itself, a new offset value can be obtained based on that output. The reason why the offset value is updated based on the output of the correction means 22 when the moving body is stopped is that the offset value can be obtained directly and accurately than using the link heading. The update of the offset value during stop can also be made based on the direct output of the turning angular velocity sensor 21 before the offset correction. That is, the output of the turning angular velocity sensor 21 during stop is an offset, so that a new offset value can be obtained based on that output.

The basic structure of an offset correcting apparatus according to the present invention is shown in FIG. 10.

The offset correcting apparatus is mounted in a vehicle, and is used for detecting a heading of the vehicle. The offset correcting apparatus comprises a gyro 112 for sensing a turning angular velocity of the vehicle, and offset correcting means 108 for correcting an offset contained in an output of the gyro 112. The heading of the vehicle is detected on the basis of an output of the offset correcting means 108.

In order to correct an offset value, there are provided location detecting means 102 and a map memory 101. The location detecting means 102 detects a current location of the vehicle. The map memory 101 stores links that are interconnected by nodes representative of predetermined coordinate positions on a map and correspond to paths that the vehicle may travel, and also stores link headings of the links along which the vehicle travels. The current location of the vehicle can be detected by dead reckoning, based on the output of the gyro 112 that is offset corrected by the offset correcting means 108 and on the output of a speed sensor for sensing a speed of the vehicle. The current location of the vehicle can also be detected by measuring a propagation delay time of the wave transmitted from a GPS (Global Positioning System) satellite.

The information about the current location detected by the location detecting means 102 is fed to matching determination means 103. The matching determination means 103 calculates a correlation between a track of the detected current location and a link stored in the map memory 101 and determines the correlation as a matching state when the correlation is in the predetermined correlation. That is, when the detected current location well matches with a link stored in the map memory 101, a correlation between the current location and the link is determined as a matching state. The link heading of the link corresponding to the current location of the vehicle as the matching state was determined is stored in initial-link-heading storing means 104.

On the other hand, it is determined if a vehicle is in a traveling state or in a stopped state. The determination result is fed to travel-time measuring means 113 that measures the continuous-travel time of the vehicle. The determination result of the matching determination means 103 is also fed to the travel-time measuring means 113. The travel-time measuring means 113 starts measuring after the initial link heading has been stored in the initial-link-heading storing means 104, and continues to measure the travel time of the vehicle during the time that the vehicle is in a traveling state and that the matching state has been determined by the matching determination means 103. If the measured travel time becomes a predetermined time, then a writing command is fed to end-link-heading storing means 105. In response to the writing command, the end-link-heading storing means 105 stores a link heading of a link corresponding to the current location detected at that time, as an end link heading.

When the vehicle stopped before the predetermined time or when the aforementioned correlation is no longer in a matching state, the time measured by the travel-time measuring means 113 is reset. It is noted that the initial-link-heading storing means 104 and the end-link-heading storing means 105 may be constituted separately by separate memory elements, or they may be constituted by a single memory element having separate memory regions.

The initial link heading and end link heading stored respectively in the initial-link-heading storing means 104 and the end-link-heading storing means 105 are fed to first detecting means 106, which detects a first heading change amount from the first and second headings. For example, the first heading change amount is obtained from a difference between the initial link heading and the end link heading.

On the other hand, the output of the gyro 112 is fed to second detecting means 107, which detects a second heading change amount corresponding to the first heading change amount by accumulating the output of the gyro 112. That is, the second detecting means 107 start accumulating the output of the gyro 112, when the initial link heading is stored in the initial-link-heading storing means 104, and the accumulation is stopped when the end link heading is stored in the end-link-heading storing means 105. The accumulated value at that time is fed as a second heading change amount to the offset correcting means 108. The accumulated value becomes a heading change amount.

In response to the first heading change amount from the first detecting means 106 and the second heading change amount from the second detecting means 107, the offset correcting means 108 calculates a new offset value. The first heading change amount is obtained based on the link heading in the matching state, so it becomes a value extremely close to an actual value. On the other hand, the second heading change amount is an accumulated value of the output of the gyro 112 obtained after the offset correction, so a drift amount of the offset produced during traveling is accumulated. Therefore, an accumulated value of the offset drift amounts is to be obtained by subtracting the first heading change amount from the second heading change amount. If the offset drift amount is obtained from the accumulated value, a new offset value can be obtained based on the offset drift amount. This new offset value is fed to the gyro 112. After offset correction, the data stored in the initial-link-heading storing means 104 and the end-link-heading storing means 105 are all cleared.

When it is determined by the matching determination means 103 that the aforementioned correlation is no longer in the matching state, the travel-time measuring means 113 starts measuring the travel time of a vehicle after an initial geomagnetic heading was stored in initial-geomagnetic-heading storing means 109, and continues to measure the travel time as long as it is determined that the vehicle is in the traveling state. If the travel time measured becomes a predetermined time, then a writing command is given to end-geomagnetic-heading storing means 110. In the end-geomagnetic-heading storing means 110, the geomagnetic heading corresponding to a current location at that time is stored as an end geomagnetic heading.

The initial geomagnetic heading stored in the initial-geomagnetic-heading storing means 109 and the end geomagnetic heading stored in the end-geomagnetic-heading storing means 110 are fed to third detecting means 111. The third detecting means 111 calculates a third heading change amount from a difference between the initial geomagnetic heading and the end geomagnetic heading.

On the other hand, the output of the gyro 112 is fed to fourth detecting means 107, which detects a fourth heading change amount corresponding to the third heading change amount by accumulating the gyro output. That is, the fourth detecting means 107 starts accumulating the output of the gyro 112 at the time that the initial geomagnetic heading was stored in the initial-geomagnetic-heading storing means 109, and stops the accumulation when the end geomagnetic heading was stored in the end-geomagnetic-heading storing means 110. The accumulated value at that time is fed as a fourth heading change amount to the offset correcting means 108. The accumulated value becomes a heading change amount.

The offset correcting means 108 calculates a new offset value on the basis of the third and fourth heading change amounts. The fourth heading change amount is an accumulated value of the output of the gyro 112 obtained after the offset correction, so a drift amount of the offset produced during traveling is accumulated. Therefore, an accumulated value of the offset drift amounts is obtained by subtracting the first heading change amount from the second heading change amount. If the offset drift amount is obtained from the accumulated value, a new offset value can be obtained based on the offset drift amount. This new offset value is fed to the gyro 112. After offset correction, the data stored in the initial-geomagnetic-heading storing means 109 and the end-geomagnetic-heading storing means 110.

BRIEF DESCRIPTION OF THE DRAWINGS

The above and other objects and advantages will become apparent from the following detailed description when read in conjunction with the accompanying drawings wherein:

FIGS. 12-15 are flow charts used to explain how an offset value is corrected.

DESCRIPTION OF THE PREFERRED EMBODIMENTS

Figure 1:
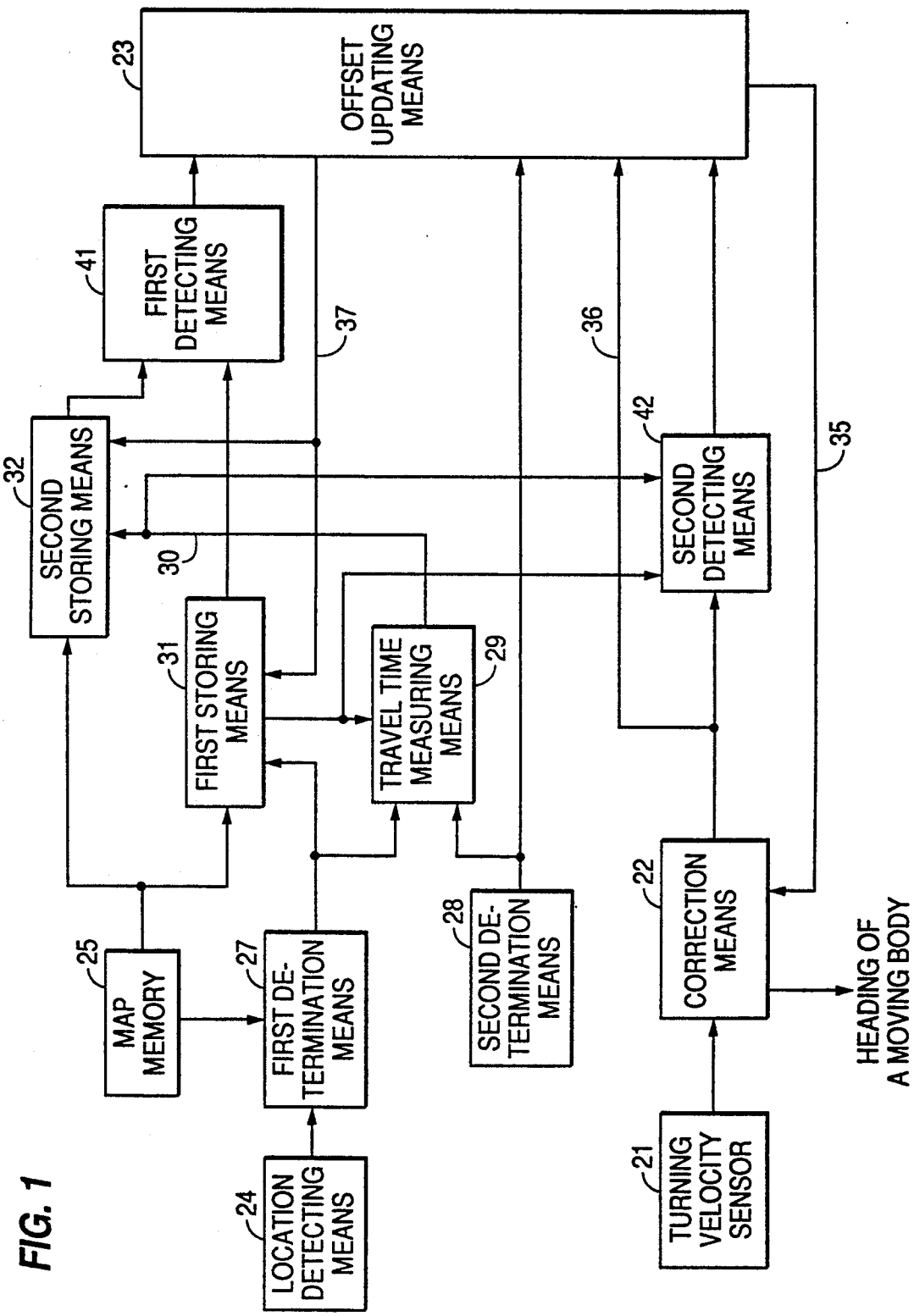
FIG. 1 is a block diagram showing a heading detecting apparatus into which a heading detecting method of the present invention is incorporated.
Figure 2:
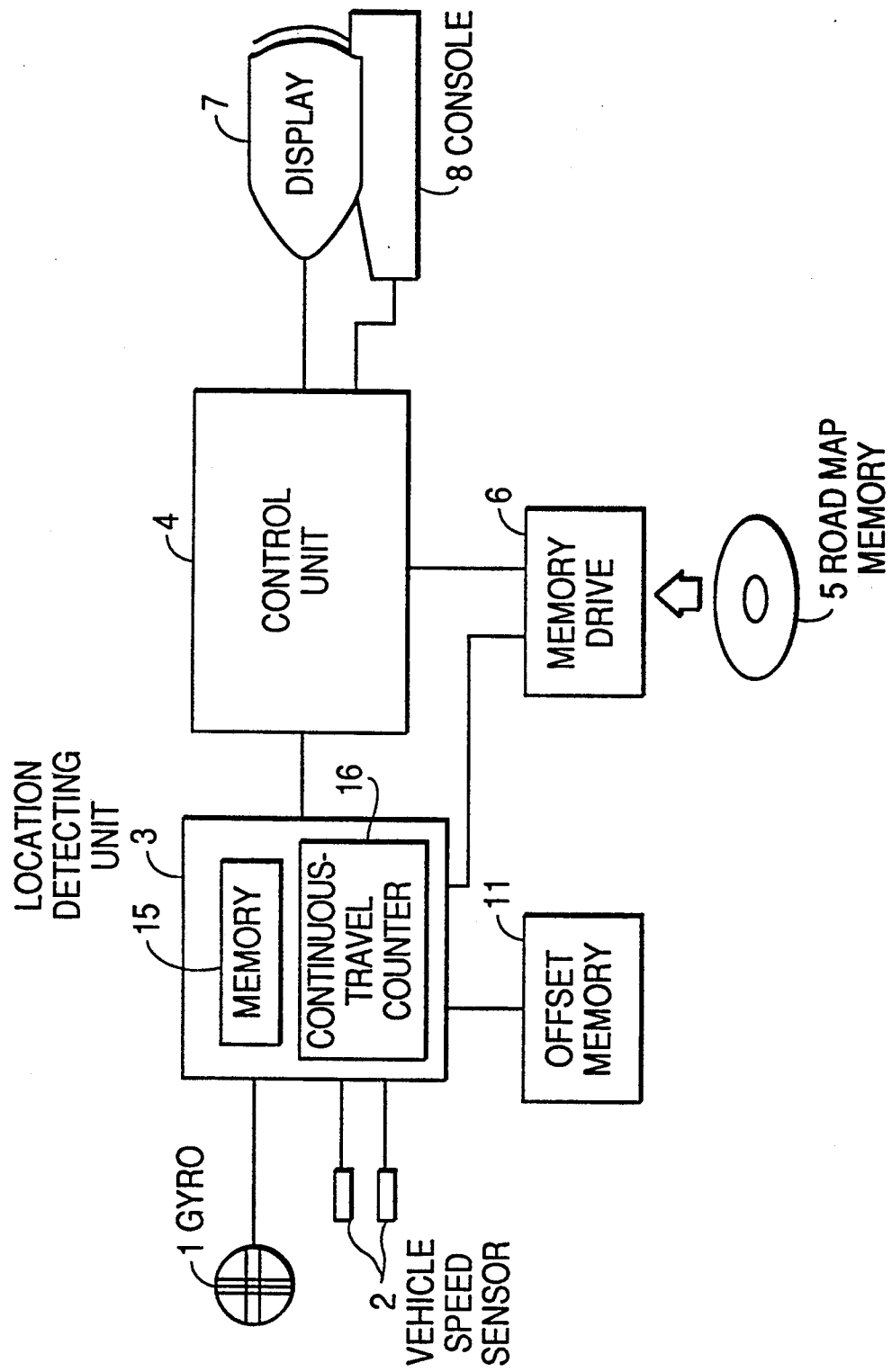
FIG. 2 is a block diagram showing a navigation apparatus in which the heading detecting method is carried out.

Referring to FIG. 2, there is shown a navigation apparatus in which a method of detecting a heading of a vehicle according to a first embodiment of the present invention is carried out. The navigation apparatus is mounted in a vehicle, and comprises a gyro 1 which is a turning angular velocity sensor for sensing the turning angular velocity of a vehicle, and a vehicle speed sensor 2 for sensing the speed of a vehicle by detecting the rotational speeds of the wheels. The outputs of the gyro 1 and the vehicle speed sensor 2 are fed to a location detecting unit 3, in which the current location of the vehicle is estimated by dead reckoning. The location detecting unit 3 is connected with an offset memory 11 which stores an offset value contained in the output of the gyro 1. In the estimation of the current location, a value corrected by subtracting the offset value from the output of the gyro is used. The location detecting unit 3 is constituted by a CPU (not shown) and has incorporated therein a memory 15 functioning as a work area and a continuous-travel counter 16 for measuring the continuous-travel time of a vehicle. The gyro 1 may comprise an optical fiber gyro, a mechanical type gyros, a vibration gyro, or a gas rate gyro.

The estimated location data representative of the current location detected in the location detecting unit 3 are fed to a control unit 4 constituted by a central processing unit (CPU). The control unit 4 reads a road map corresponding to the aforementioned estimated location data out of a road map memory 5 through a memory drive 6, and displays the estimated location on a display 7, together with that road map. A console 8 is connected to the control unit 4 and has a keyboard (not shown) which allows a vehicle operator to start and stop this apparatus, to move a cursor on the picture screen of the display 7, and to scroll the road map displayed on the picture screen. The heading data representative of the heading of a vehicle is also fed from the location detecting unit 3 to the control unit 4, together with the estimated location data. The heading of a vehicle is also displayed on the display 7.

In the location detection in the location detecting unit 3, the aforementioned dead reckoning is used in combination with a map matching method in which the estimated location obtained by dead reckoning is matched with the road map read out of the road map memory 5 through the memory drive 6. In the map matching method, the estimated location is corrected to a road on the road map.

The road map memory 5 is constituted by a mass storage medium memory such as a CD-ROM, and stores therein combination data of nodes and links. The node is referred to as a coordinate position on road map for specifying an intersection or branch point of a road. The link corresponds to a road between the nodes, and as a rule, a vehicle can be specified only by a coordinate position on the link. Road data comprise node data and link data. The node data comprise a node number and an address of a link connected to the node, and the link data comprise a link number, addresses of start point and end point nodes, a link distance, a link heading, and road classification (freeways, arteries, streets, etc.). In the embodiment of the present invention, an offset value for offset correction of the gyro 1 is updated with the aforementioned link.

The detection of a heading of a vehicle in the location detecting unit 3 will hereinafter be described in detail. The heading of the vehicle is detected based on the output of the gyro 1, as described above. The output of the gyro 1 contains an offset value that is an output of the gyro 1 as the turning angular velocity of the vehicle is zero. This offset value has been stored in the offset memory 11, and the location detecting unit 3 makes an offset correction by subtracting the offset value stored in the offset memory 11 from the output of the gyro 1. By accumulating a value obtained from this offset correction, a heading change amount of the vehicle is detected. Therefore, the heading of the vehicle is to be detected by giving an initial heading from the console 8.

On the other hand, the offset value drifts due to temperature and humidity changes, as described above. Therefor, if the offset value stored in the offset memory 11 is always used, errors caused by the aforementioned drift will be accumulated and a large error will occur in a detected heading. For this reason, it is necessary to detect an accurate drift value in which the amount of the drift has been corrected and to make an offset correction with this new offset value. It is preferable that the offset value be updated at short intervals. If the same offset value is use for a long period of time, a large error is to occur in a detected heading.

When a vehicle stops at an intersection, a value obtained during this stop by correcting the output of the gyro 1 with the previous offset value OF(N−1) will be an offset drift amount δOF, because a real turning angular velocity during this stop is zero. Therefore, the location detecting unit 3 detects an offset drift amount δOF every time a vehicle stops, on the basis of the output of the gyro 1 in which the offset correction has been made, and calculates a new offset value OF(N) by correcting the offset drift amount δOF. The offset value stored in the offset memory 11 is updated to the new offset value OF(N).

When a vehicle is traveling a freeway, it is required that the offset value is updated to a new value even during traveling, because the continuous travel time of the vehicle becomes long.

Figure 3:
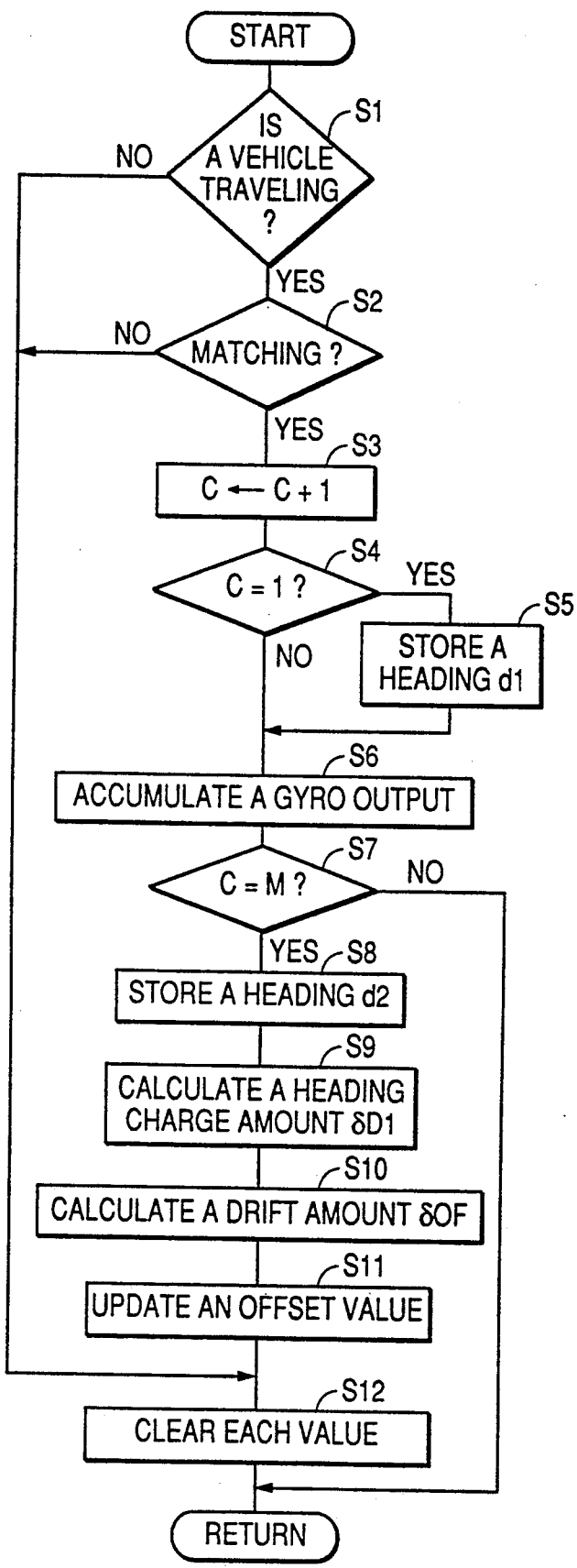
FIG. 3 is a flow chart showing how an offset value is updated when the continuous travel time of a vehicle becomes long.

FIG. 3 shows how the update of the offset value by the location detecting unit 3 is performed when the continuous travel time of a vehicle becomes long. In step S1, it is determined whether a vehicle is traveling on the basis of the output of the vehicle speed sensor 2. If it is determined that a vehicle is in its stopped state, the step S1 advances to step S12 and to "RETURN" and an offset value as the vehicle stopped is updated.

In step S2, a degree of correlation between the track of the estimated location of the vehicle detected by dead reckoning and a link in the neighborhood of this estimated location is calculated. Based on the degree of correlation, it is determined if the neighboring link well matches with the track of the estimated location. If "NO", the step 2 advances to the S12 and to the "RETURN". If "YES", the step S2 advances to step S3, in which the counter value C of the continuous-travel counter 16 is incremented. That is, only when it is determined that a vehicle is traveling and that the estimated location of the vehicle matches with the neighboring link, the continuous-travel counter 16 performs a counting operation.

The step S3 advances to step S4, in which it is determined if the counter value C of the continuous-travel counter 16 is 1. If the counter value C is 1, the step S4 advances to step S5, in which the link heading of a link corresponding to the current location of a vehicle at that time is stored as a first heading d1 in a predetermined memory region of the memory 15 in the location detecting unit 3. If the counter value C is a value other than 1, the step S4 advances to step S6, in which the output of the gyro 1 is accumulated. The output of the gyro 1 to be accumulated is an output after the offset correction has been made based on the offset value stored in the offset memory 11. After the accumulation of the gyro output, the step S6 advances to step S7, in which it is determined if the counter value C of the continuous-travel counter 16 is equal to a predetermined value M corresponding to a predetermined time T (e.g., 300 seconds). If the counter value C of the continuous-travel counter 16 is not equal to the predetermined value M, the step S7 advances to "RETURN" and the operation is repeated from the step S1. If the counter value C of the continuous-travel counter 16 is equal to the predetermined value M, the step S7 advances to step S8, in which the link heading of a link corresponding to the current location of the vehicle at that time is stored as a second heading d2 in the memory 15 of the location detecting unit 3. That is, the second heading d2 is to be stored only when the vehicle travels continuously for a predetermined period of time T after the first heading d1 was stored and also the estimated location of the vehicle continues to match with the neighboring link for the predetermined period T.

After the second heading d2 has been stored in the location detecting unit 3, the step S8 advances to step S9, in which a difference between the headings detected at an interval of the aforementioned predetermined time T is obtained by subtracting the first heading d1 stored in the step S5 from the second heading d2 stored in the step S8. This value is the heading change amount δD1 of a vehicle during the aforementioned predetermined time T. This heading change amount δD1 corresponds to an amount of change of the first heading. The first heading change amount δD1 is very accurate, because the δD1 is based on the heading of a link obtained as the heading of the link matches with the track of the estimated location.

On the other hand, the accumulated value of the outputs of the gyro 1 after the offset correction of the gyro 1 in the interval of the predetermined time T becomes a second heading change amount δD2. This second heading change amount δD2 contains an accumulated value Σ of drift amounts δOF of the offset caused due to a change of temperature and humidity. On the other hand, noise components caused by the vibration of a vehicle during traveling is substantially offset by accumulating the gyro outputs after the offset of the gyro 1 was corrected, over a period of time more than the aforementioned predetermined time T. Therefore, a difference between the second heading change amount δD2 and the first heading change amount δD1 corresponds to the accumulated value Σ of drift amounts in the interval of the aforementioned predetermined time T.

Since it is desired that the offset value OF is updated for a shorter period of time, it is necessary that the predetermined time T is made as short as possible. However, it is preferable that the predetermined time T be 300 seconds, as stated above, if the removal of the noise caused by the vibration during traveling is taken into consideration.

Figure 4:
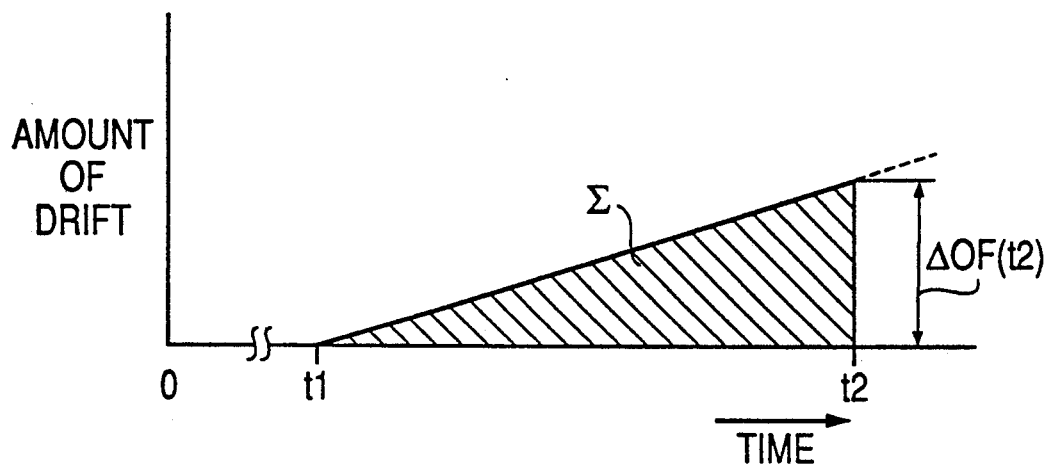
FIG. 4 is a diagram used to explain how an amount of offset drift of the gyro of FIG. 2 is calculated.

In step S10, the accumulated value Σ of the drift amounts δOF is obtained from the aforementioned heading change amounts δD1 and δD2, and the drift amount δOF is calculated based on the accumulated value Σ. The calculation of the drift amount δOF, as shown in FIG. 4, is made on the assumption that the offset drift amount δOF at the correction time (time t1) of a previous offset value is zero and the offset drift amount δOF is monotonously increased from the time t1 in proportion to the elapse of time. That is, since the accumulated value Σ is equal to the area of a region indicated by the oblique lines in FIG. 4, the offset drift amount δOF is calculated based on the following equation (2):

$$\Sigma = \int \delta OF(t)dt = \frac{1}{2} \delta OF(t2) \cdot \delta T \qquad (2)$$

where $\delta T = (t2 - t1)$.

In equation (2), time t1 represents the time the first link heading was stored in the step S5, and time t2 represents the time the second link heading was stored in the step S9. The time interval $\delta T$ is equal to the aforementioned predetermined time T. From equation (2), the offset drift amount $\delta OF$ is obtained by the following equation (3):

$$\delta OF = 2 \cdot \Sigma / \delta T \qquad (3)$$

The step S10 advances to step S11, in which the previous offset value OF(N−1) is read out of the offset memory 11. On the basis of this offset value OF(N−1), a new offset value OF(N) is calculated. This new offset value OF(N) is then stored in the offset memory 11. The new offset value OF(N) can be calculated simply by the following equation (4):

$$OF(N) = OF(N-1) + \delta OF \qquad (4)$$

However, in the embodiment of the present invention, the new offset value OF(N) is calculated according to the following equation (5):

$$OF(N) = (1-K) \cdot OF(N-1) + K \cdot (OF(N-1) + \delta OF) \qquad (5)$$

where $0 \leq K \leq 1$.

Figure 5:
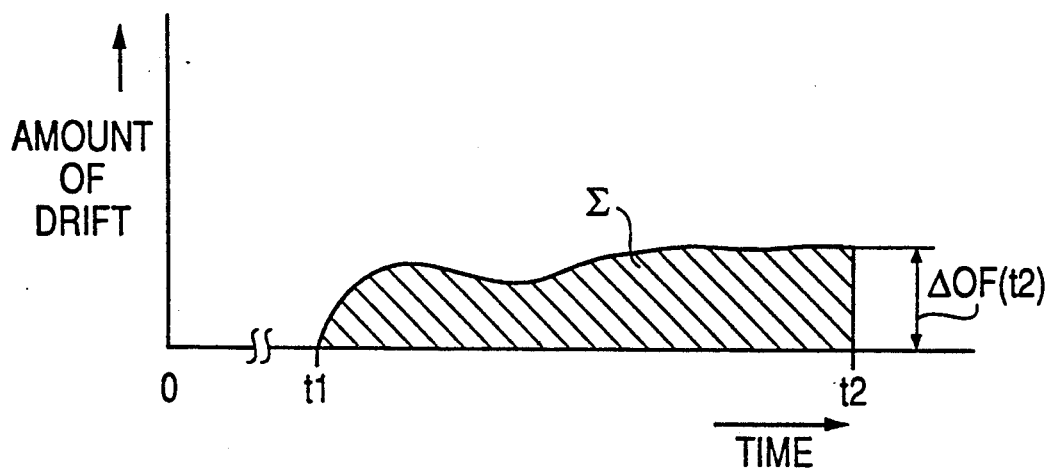
FIG. 5 is a diagram illustrating how an actual offset drift amount varies with time.

With equation (5), the offset value OF is filtered and updated. Therefore, the update of the offset value is very accurate. That is, as described above, the update of the offset value is made on the assumption that the offset drift amount $\delta OF$ varies linearly as shown in FIG. 4. However, an actual offset drift amount $\delta OF$ varies complicatedly. For example, an actual offset drift amount varies as shown in FIG. 5. For this reason, there are some cases where a large difference occurs between an actual offset drift amount $\delta OF$ and the offset drift amount $\delta OF$ obtained according to the aforementioned equations (2) and (3). If the offset value OF is updated with a value largely departed from an actual offset drift amount, the offset value OF will be updated to an extremely large value or an extremely small value. With such state, if the track of a vehicle does not match with road map, the offset correction is be made with an inaccurate offset value OF until the vehicle stops, so that there is the possibility that a larger error occurs in the detection of heading. Further, since a large error is to be contained in the offset value OF updated with an offset drift amount $\delta OF$ containing errors, there is no guarantee that a new offset value (N+1) which is to be updated with the offset value OF(N) containing such a large error is updated to a correct value. Therefore, as described above, by filtering the offset value OF, an offset value can be updated more accurately. The value of K in the aforementioned equation (5) is preferable to be between 0.4 and 0.6. If the value of K is between 0.1 and 0.3, the amount of the update of the offset value becomes small and therefore the effect of calibration during traveling is reduced. If the value of K is above 0.7, the offset value becomes excessively large or small and the errors in the detection of heading become large.

After the offset value OF has been updated in the step S11, the step S11 advances to step S12, in which the counter value C of the continuous-travel counter 16, the accumulated value of the gyro outputs after the offset correction of the gyro 1, and the first and second headings d1 and d2 are all cleared. As described above, in a case where a vehicle continues to travel over the predetermined time T, the heading change amount $\delta D1$ in the time interval of the predetermined time T is detected on the basis of the link heading read out of the road map memory 5, and the heading change amount $\delta D2$ is detected by accumulating gyro outputs obtained after the offset correction of the gyro 1. On the basis of the two heading change amounts $\delta D1$ and $\delta D2$, the offset drift amount $\delta OF$ is obtained and the offset value is updated with this offset drift amount $\delta OF$. Therefore, even if a vehicle travels continuously for a long period of time, the offset value can be updated during traveling. For example, even when a vehicle travels a freeway, a large error can be prevented from occurring in the heading of the vehicle detected on the basis of the output of the gyro 1. Further, the location detection of the vehicle becomes very accurate and the current location and heading of the vehicle can be displayed accurately on the display 7. When, on the other hand, a vehicle stops, the offset value OF is updated on the output of the gyro 1 at that time. This is because the offset value can be obtained directly and accurately than obtaining the offset value by using the heading of a link.

Figure 6:
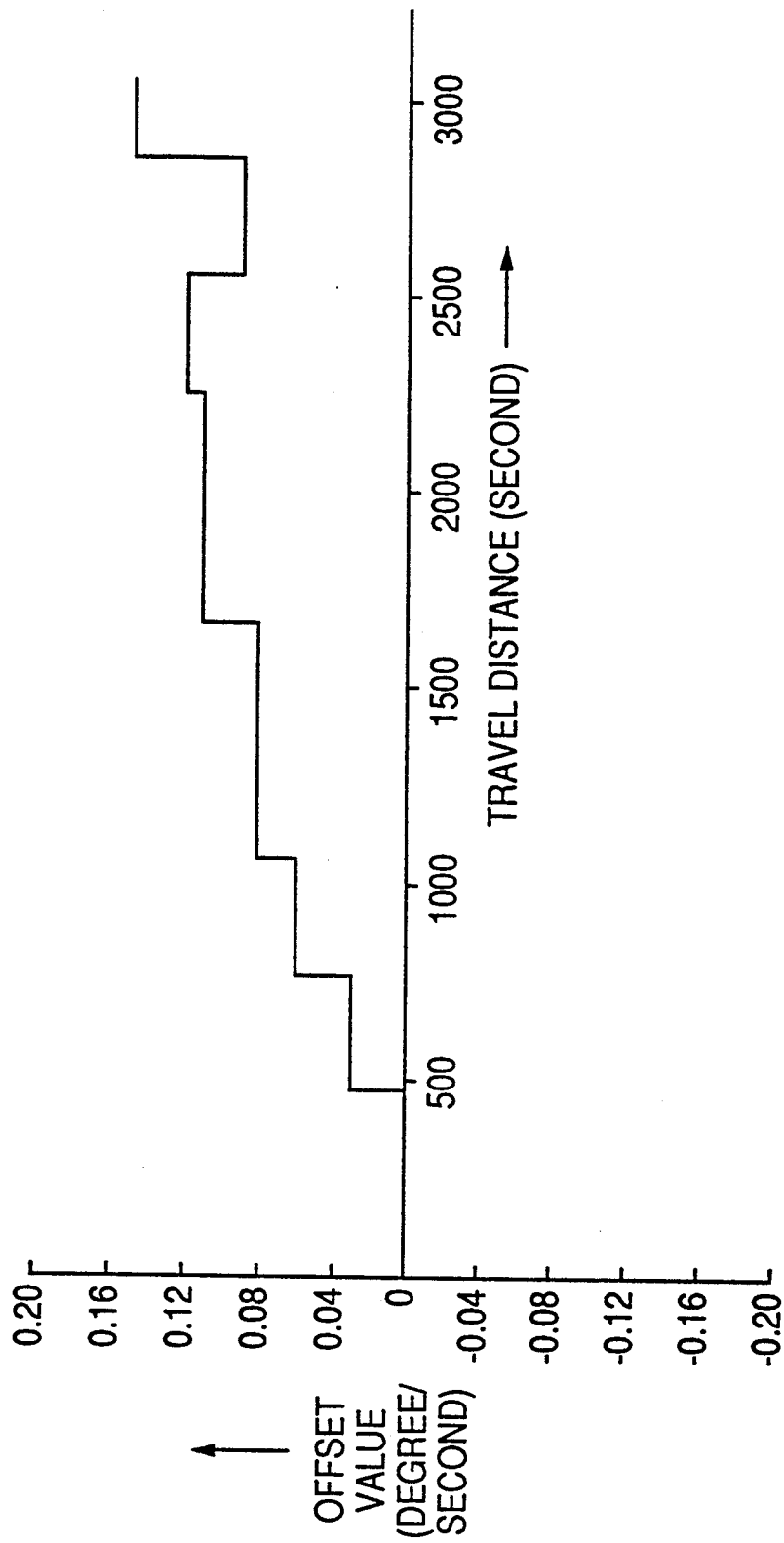
FIG. 6 is a diagram illustrating how the offset value varies with time.
Figure 7:
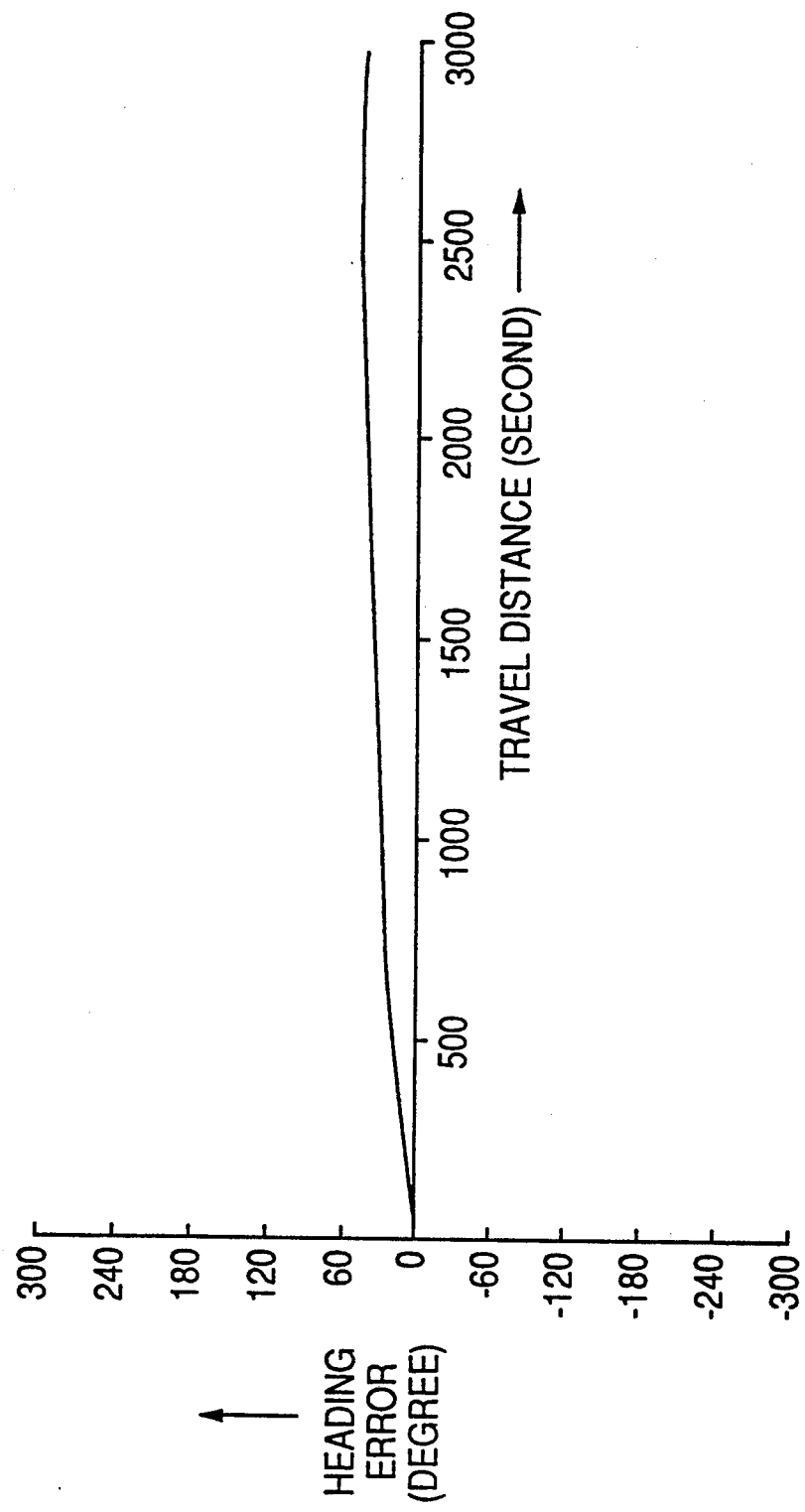
FIG. 7 is a diagram illustrating an error in the heading obtained in accordance with present invention.
Figure 8:
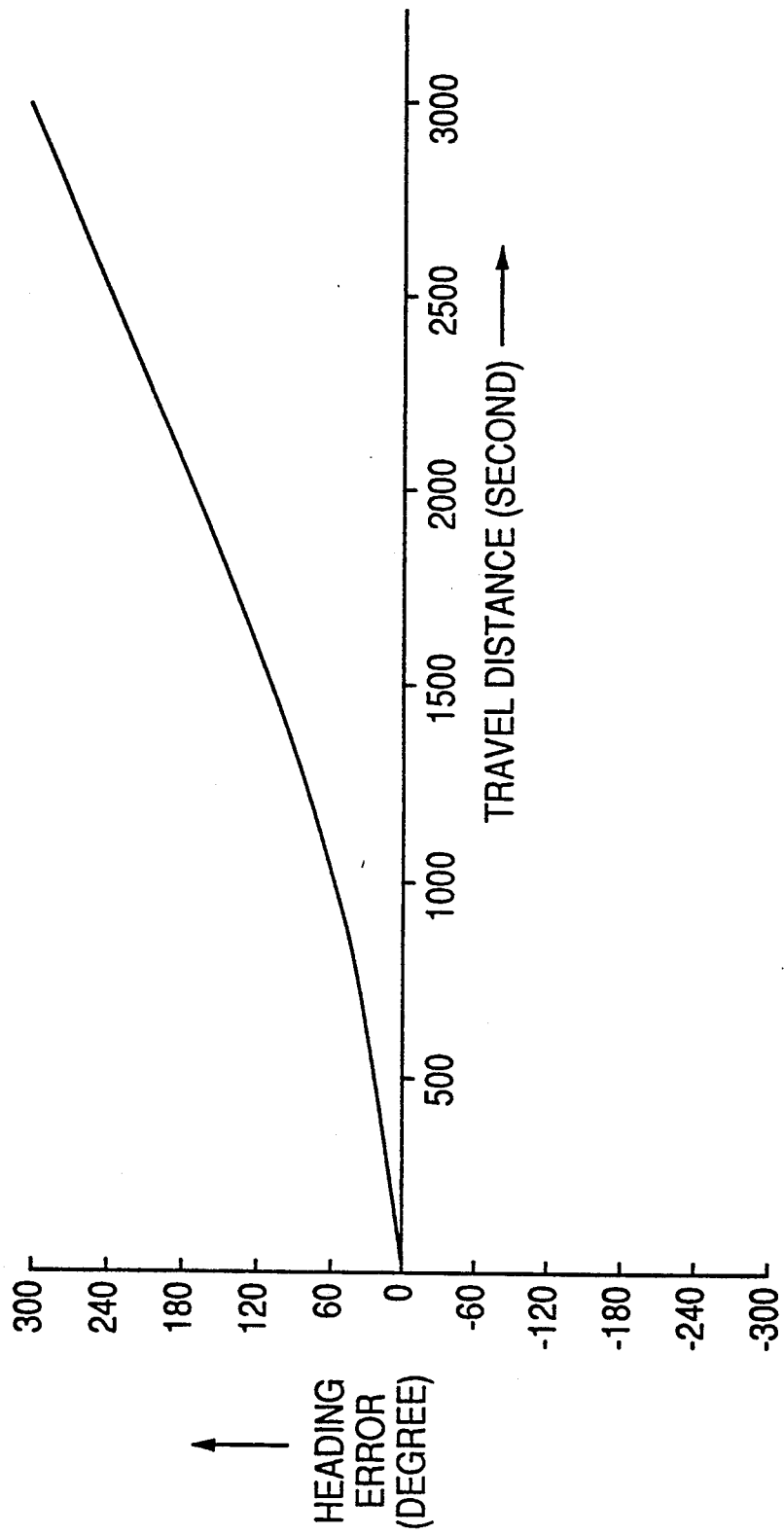
FIG. 8 is a diagram illustrating an error in the heading obtained according to prior art.

FIGS. 6, 7, and 8 illustrate test results obtained by the inventor. In the test, a vehicle traveled a freeway for 50 minutes. FIG. 6 illustrates how the offset value OF varies with time. The aforementioned predetermined time T was set to 300 seconds and the K in equation (5) was set to 0.5. In table 1, there are shown offset values obtained on the basis of a difference in heading change amount between the first and second heading change amounts $\delta D1$ and $\delta D2$.

TABLE 1

| Time (second) | Difference between $\delta D1$ and $\delta D2$ (degree) | Offset Value (degree/second) |
|---|---|---|
| 175–474 | 8.00 | 0.03 |
| 475–774 | 9.19 | 0.06 |
| 775–1074 | 6.21 | 0.08 |
| 1375–1674 | 9.79 | 0.11 |
| 1675–1974 | −1.49 | 0.11 |
| 1975–2274 | 2.94 | 0.12 |
| 2275–2574 | −8.15 | 0.09 |
| 2575–2874 | 18.08 | 0.15 |

FIG. 7 shows a difference between the heading detected based on the updated offset value of table 1 and an accurate heading measured at each point of a road. It is understood from FIG. 7 that the heading error during 50-minute travel is less than 50 degrees. In table 2, an angle difference produced in the time interval of 300 seconds and an accumulated angle difference of this angle difference. The heading error shown in FIG. 7 corresponds to the accumulated angle difference.

TABLE 2

| Time (second) | Angle Difference (degree) | Accumulated Angle Difference (degree) |
|---|---|---|
| 1–300 | 10.56 | 10.56 |
| 301–600 | 8.17 | 18.72 |
| 601–900 | 5.23 | 23.96 |
| 901–1200 | 2.83 | 26.79 |
| 1201–1500 | 4.18 | 30.97 |
| 1501–1800 | 3.44 | 34.41 |
| 1801–2100 | 4.53 | 38.94 |
| 2101–2400 | −0.21 | 38.73 |
| 2401–2700 | 8.03 | 46.76 |
| 2701–3000 | 1.39 | 48.15 |

TABLE 2-continued

| Time (second) | Angle Difference (degree) | Accumulated Angle Difference (degree) |
|---|---|---|
| 3001-3300 | −6.31 | 41.83 |

FIG. 8 shows a difference between the heading detected without updating the offset value during traveling and an accurate heading measured at each point of a road. It is understood from FIG. 8 that the heading error during 50-minute travel is about 300 degrees. This test results are in table 3.

TABLE 3

| Time (second) | Angle Difference (degree) | Accumulated Angle Difference (degree) |
|---|---|---|
| 1-300 | 10.56 | 10.56 |
| 301-600 | 11.52 | 22.08 |
| 601-900 | 17.09 | 39.17 |
| 901-1200 | 22.63 | 61.80 |
| 1201-1500 | 27.57 | 89.37 |
| 1501-1800 | 30.95 | 120.12 |
| 1801-2100 | 37.09 | 157.41 |
| 2101-2400 | 32.72 | 190.13 |
| 2401-2700 | 39.24 | 229.37 |
| 2701-3000 | 35.47 | 264.84 |
| 3001-3300 | 34.96 | 299.80 |

Figure 9:
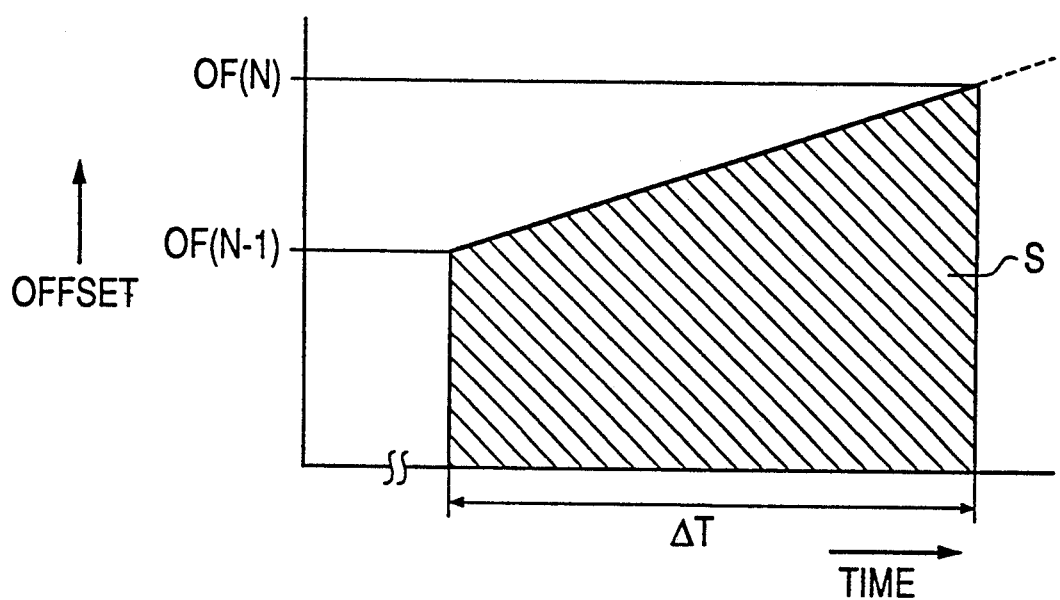
FIG. 9 is a diagram used to explain how the offset value is calculated.
Figure 10:
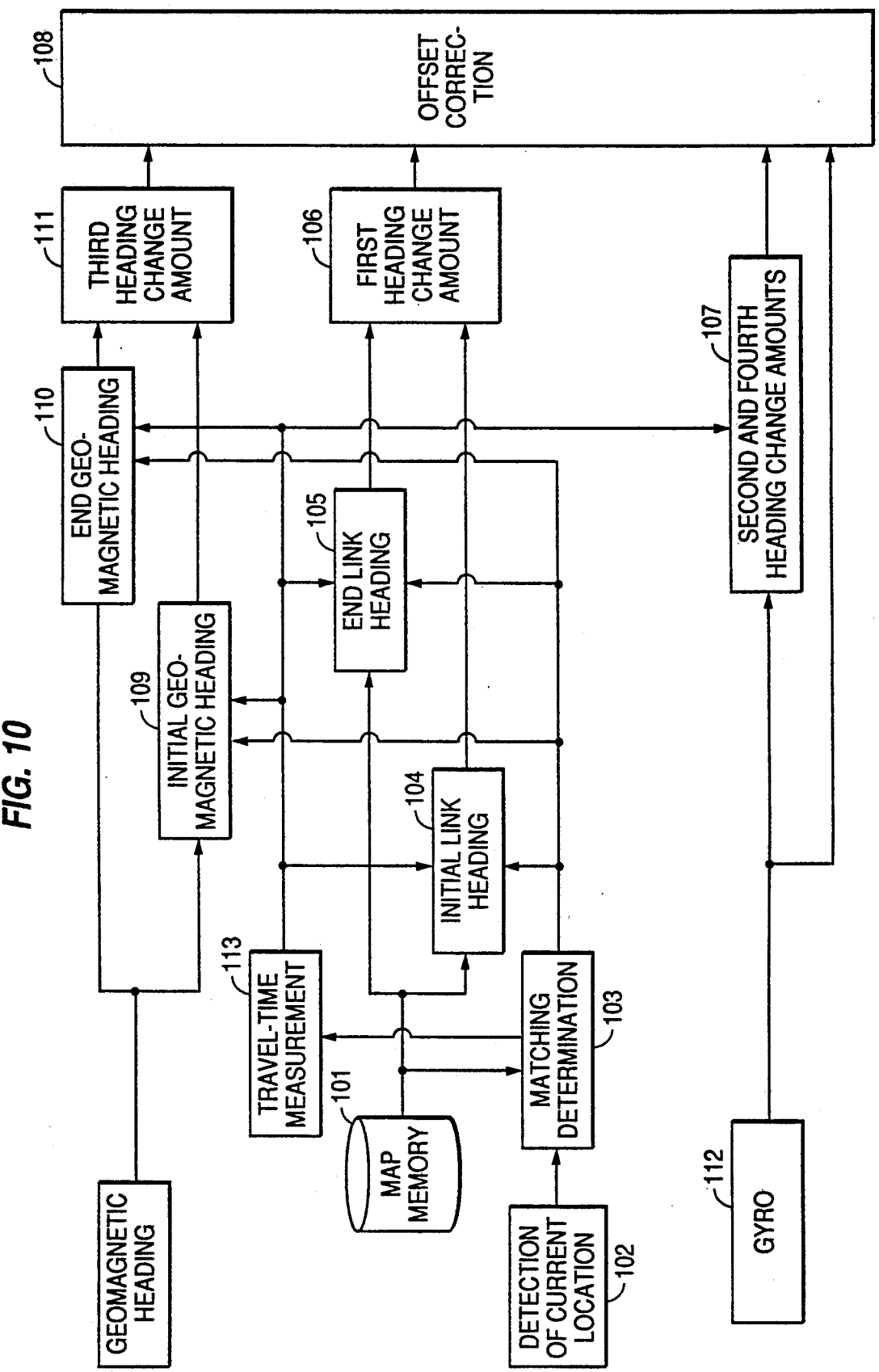
FIG. 10 is a block diagram showing the basic structure of an offset correction apparatus according to the present invention.

A second embodiment of the present invention will hereinafter be described. In the aforementioned first embodiment of the present invention, the offset of the gyro 1 is corrected and the second heading change amount $\delta D2$ is obtained by accumulating values obtained after the offset correction. The offset drift amount $\delta OP$ is then calculated by comparing the second heading change amount $\delta D2$ with the first heading change amount $\delta D1$ obtained based on the link heading. In the second embodiment of the present invention, the output of the gyro 1 before the offset correction is accumulated. A difference between the accumulated value before the offset correction and the first heading change amount $\delta D1$ is an accumulated value of the offset values containing the offset drift amounts $\delta OF$. Therefore, if it is assumed that the offset value OF drifts linearly with the elapse of time as shown in FIG. 9, the accumulated value S of the offset values corresponds to an area of a region indicated by the oblique lines in FIG. 9. The accumulated value S can be expressed by the following equation (6):

$$S = \tfrac{1}{2}(OF(N) + OF(N-1)) \cdot \delta T \quad (6).$$

Therefore, a new offset value OF(N) will be obtained by the following equation (7):

$$OF(N) = 2S/\delta T - OF(N-1) \quad (7).$$

Like the first embodiment of the present invention, when the continuous-travel time of a vehicle becomes the aforementioned predetermined time T, an offset value can be updated to an accurate value even during traveling and the heading of the vehicle detected accurately. While the aforementioned embodiments have been described with relation to a navigation apparatus for detecting the heading of a vehicle, it is noted that the present invention can also be used for detecting headings of other moving bodies such as ships and aircraft.

Figure 11:
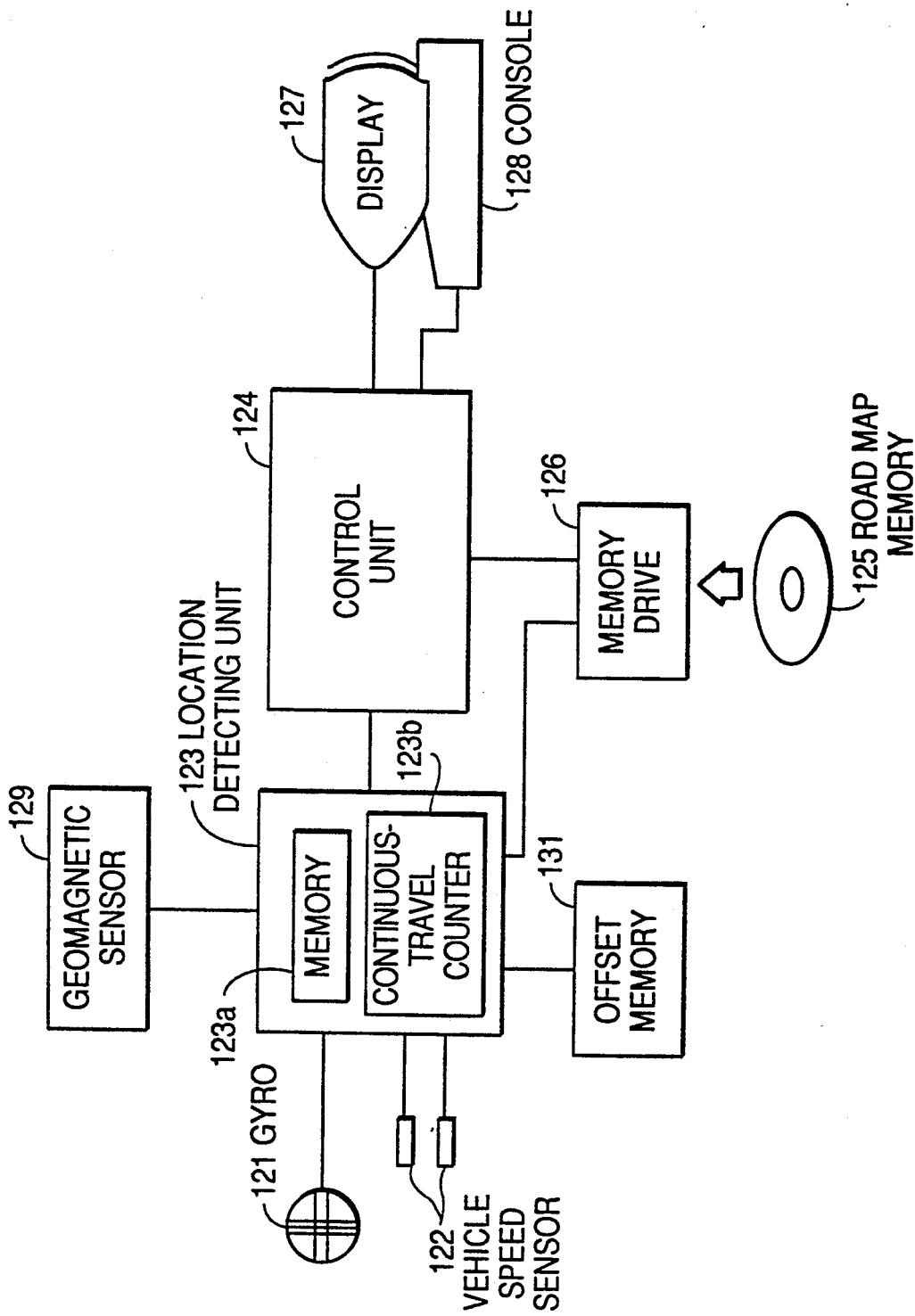
FIG. 11 is a block diagram showing a navigation apparatus to which an offset correction method according to an embodiment of the present invention is applied.
Figure 12:
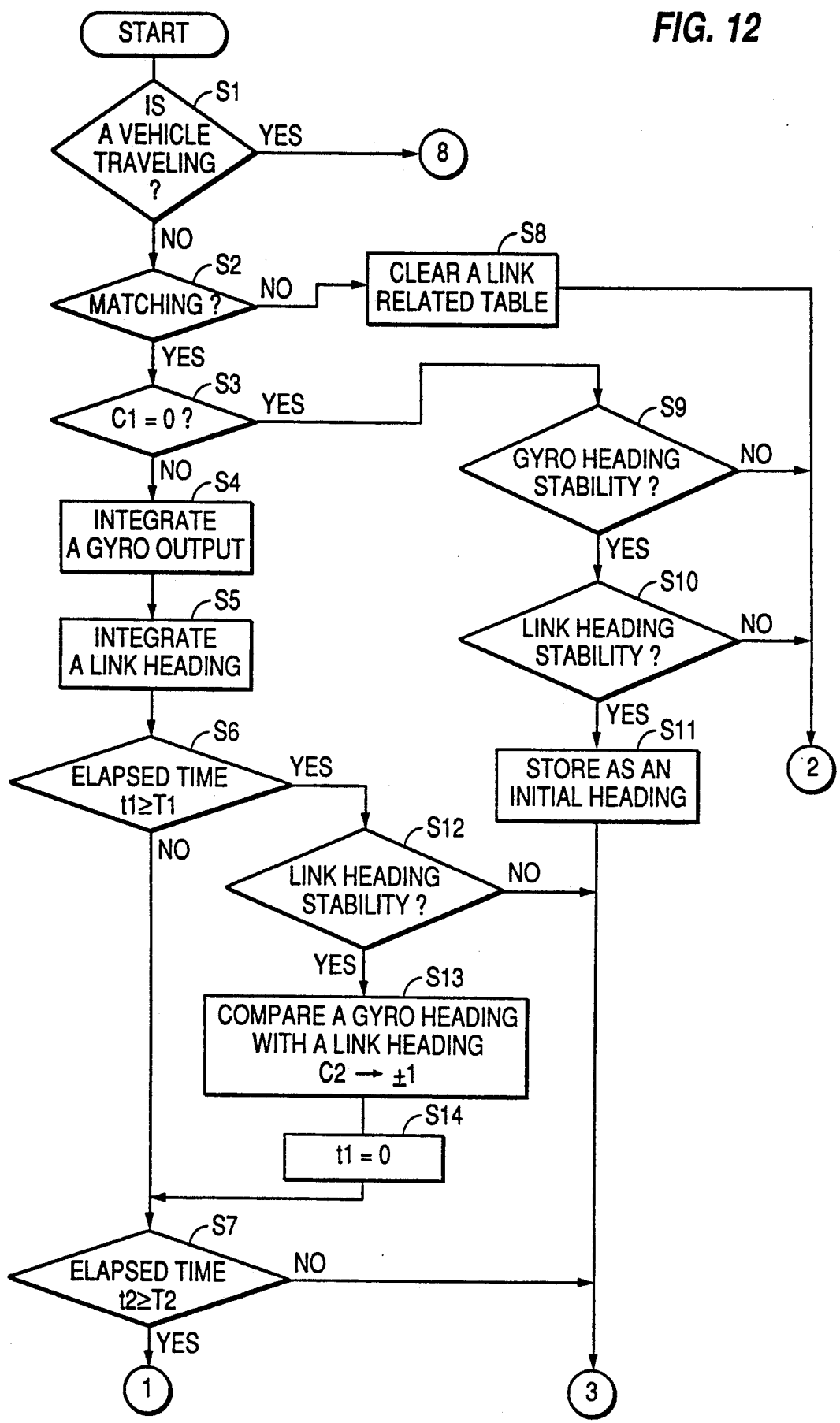
Figure 13:
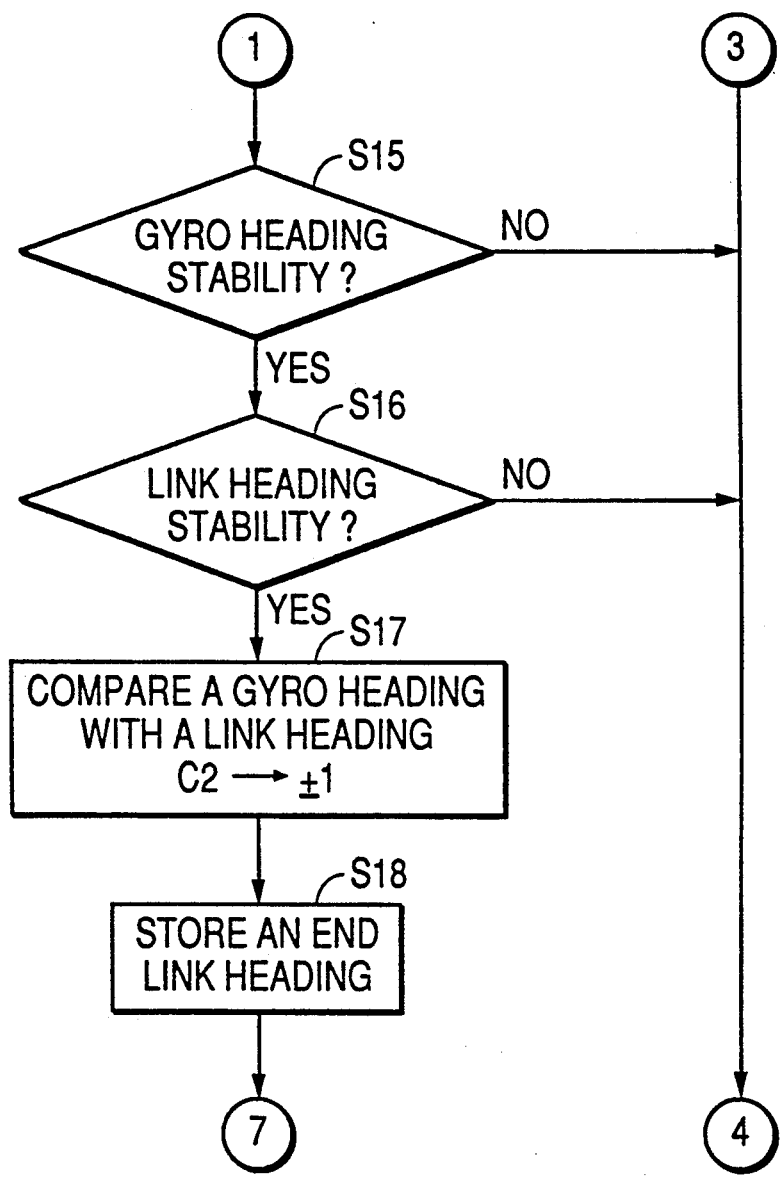
Figure 14:
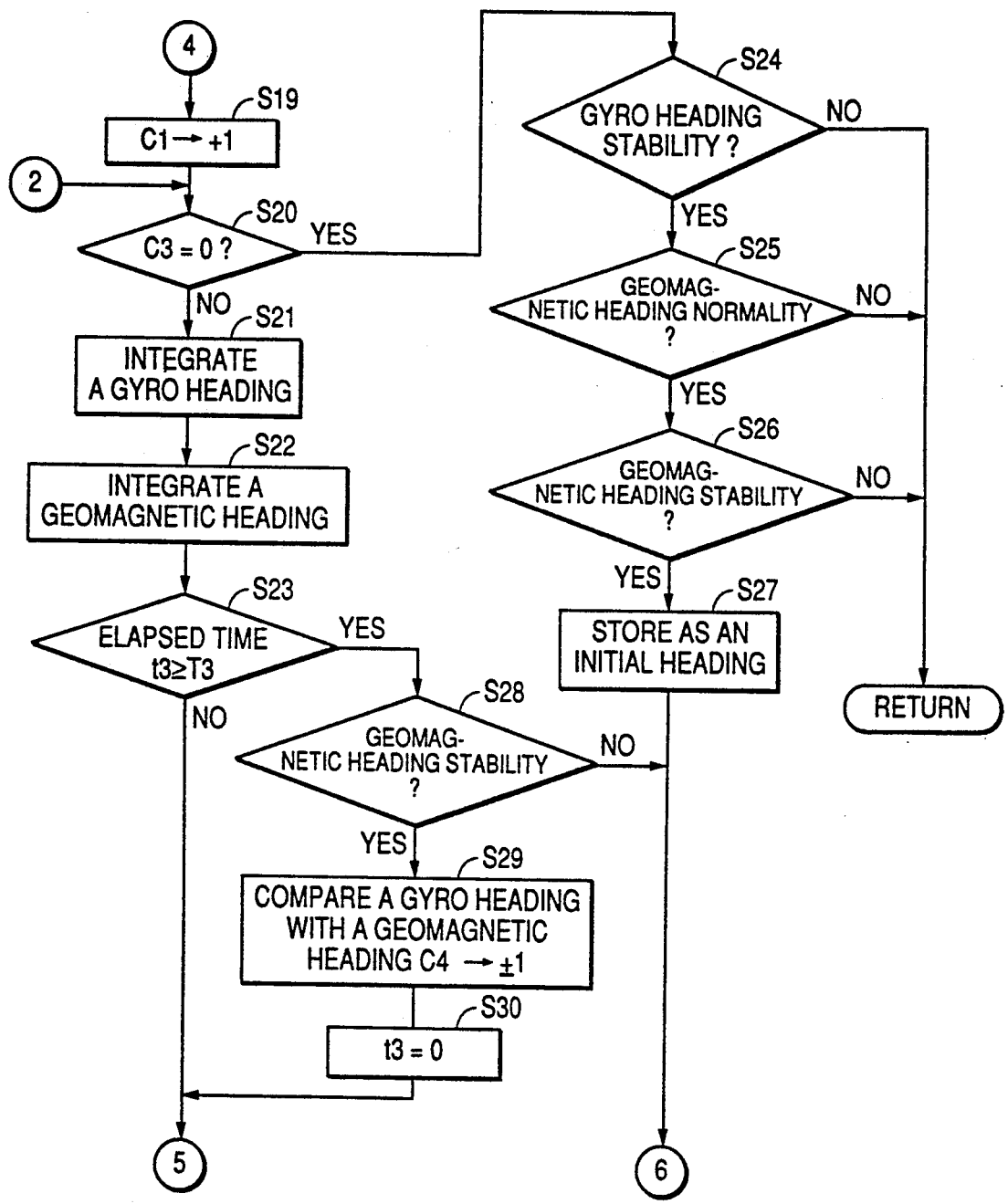

Referring to FIG. 11, there is shown a navigation apparatus in which an offset correction method of the present invention is carried out. The navigation apparatus is mounted in a vehicle, and comprises a gyro 121 for sensing the turning angular velocity of a vehicle, and a vehicle speed sensor 122 for sensing the speed of a vehicle by detecting the rotational speeds of the wheels. The outputs of the gyro 121 and the vehicle speed sensor 122 are fed to a location detecting unit 123, in which the current location of the vehicle is estimated by dead reckoning. The location detecting unit 123 is connected with an offset memory 131 which stores an offset value contained in the output of the gyro 121. In the estimation of the current location, a value corrected by subtracting the offset value from the output of the gyro is used. The location detecting unit 123 is constituted by a CPU (not shown) and has incorporated therein a memory 123a functioning as a work area and a continuous-travel counter 123b for measuring the continuous-travel time of a vehicle. The memory 123a of the location detecting unit 123 stores a table related to link heading correction, a table related to geomagnetic heading correction, and so on. A geomagnetic sensor 129 is connected to the location detecting unit 123.

The parts of FIG. 11 are substantially identical to corresponding parts of FIG. 2 and therefore a detailed description will hereinafter be not given. Also, the detection of a heading of a vehicle by the location detecting unit 123 is the same as the detection by the location detecting unit 3 of FIG. 2 and therefore a description of the heading detection by the unit 123 will be not given.

FIGS. 12-15 show how the offset value is corrected. In step S1, it is determined whether a vehicle is traveling on the basis of the output of the vehicle speed sensor 122. If it is determined that a vehicle is in its stopped state, an offset value is corrected on the base of the output of the gyro as the vehicle is in the stopped state. Without the offset correction based on the link heading and the offset correction based on the geomagnetic heading, the step S1 advances to "RETURN" through step 40 and step 41.

In step S2, a degree of correlation between the track of the estimated location of the vehicle detected by dead reckoning and a link in the neighborhood of this estimated location is calculated. If there exists a link having a predetermined correlation and therefore that link well matches with the track of the estimated location, then it is determined that the correlation between the link and the track is in a matching state. If the matching state does not exist, the step 2 advances to step S8.

If the matching state exists, the step S2 advances to step S3, in which it is determined if a counter C1 is equal to zero. If it is determined that the previous link heading and the link heading are in the stable state and the vehicle is in a straight traveling state, the counter C1 is incremented one by one each time the values of the gyro heading and the link heading are stored (step S19). If the counter C1 is equal to 1 (that is, the gyro heading and the link heading have not been stored in the memory 123a), the step S3 advances to step S9, in which it is determined if the last gyro heading is in the stable state. More particularly, it is checked if a change in each data for a predetermined time (e.g., 3 seconds) is below a reference value, on the basis of the previous gyro heading data obtained every constant time (e.g., 0.1 second). If the counter value below the reference value is more than a predetermined number (e.g., a number corresponding to 30 seconds or 3 seconds), it is determined that the gyro heading is in the stable state. Also, in step S10, it is determined if the last link heading is in the stable state. Likewise, it is checked if a change in each data is less than a reference value, on the basis of the link heading data obtained every constant traveled distance and accumulated. Only when the heading data change is less than the reference value, the counter is incremented, and if the case below the reference value is more than a predetermined number, then it is determined that the link heading is in the stable state. In step S11, the gyro heading data is stored as an initial gyro heading in the memory 123a and the link heading data is stored as an initial link heading in the memory 123a.

If the counter value of the counter C1 is above 1, the step S3 advances to step S4. In the step S4, by integrating the output (i.e., angular velocity) of the gyro on the basis of the aforementioned initial gyro heading, the gyro heading is obtained. Then, the step S4 advances to step S5, in which, by integrating a link heading difference of the map on the basis of the aforementioned initial link heading, the link heading is obtained. In step S6, an elapsed time t1 from the time that data were cleared in the step 40 is read out of the continuous-travel counter 116, and it is determined if the elapsed time $t1 \geq$ a predetermined time T1 (e.g., 100 seconds). If "NO", the step S6 advances to step S7, in which it is determined if an elapsed time t2 from the time the counter C1 was counted is above a predetermined time T2 (e.g., 300 seconds). If NO, the step S6 advances to step S19, in which the counter C1 is incremented by 1. Thereafter, a geomagnetic heading will be evaluated.

After "RETURN", it is again determined in the step S6 if $t1 \geq T1$. If YES, the step S6 advances to step S12, in which it is checked if the last link heading is in the stable state for caution's sake, as in the case of the step S10. The reason why the stability of the last link heading is checked is that an offset value can be obtained more accurately during straight travel in which the link heading is in the stable state. Conversely speaking, in an intermediate point until the elapsed time t1 elapses T1, a sufficiently accurate offset value can be obtained even if a vehicle does not travel straight. If the last link heading is in the stable state, the step S12 advances to step S13, in which the gyro integrated heading is compared with the link integrated heading. If gyro integrated heading > link integrated heading, the counter C2 is increased by one. If gyro integrated heading < link integrated heading, the counter C2 is decreased by one. In step S14, the elapsed time t1 is made zero. The step S14 returns back to the step S7.

In the step S7, the elapsed time t2 is checked. If t2<T2, the step S7 advances to the step S19, in which the counter C1 is incremented by 1. Thereafter, a geomagnetic heading will be evaluated.

After "RETURN", it is again determined in the step S6 if t1<T1. If YES, the step S6 advances to the step S12, in which it is checked if the last link heading is in the stable state for caution's sake, as in the case of the step S10. If the last link heading is in the stable state, the step S12 advances to the step S13. In the step S13, the gyro integrated heading is compared with the link integrated heading. As described above, if gyro integrated heading > link integrated heading, the counter C2 is increased by one, and if gyro integrated heading < link integrated heading, the counter C2 is decreased by one. In step S14, the elapsed time t1 is made zero. Again, the step S14 returns back to the step S7.

In the step S7, the elapsed time t2 is checked. If $t2 \geq T2$, the step S7 advances to step S15 and step S16. In the step S15, it is checked if the last gyro heading is in the stable state for caution's sake, as in the case of the step S9. In the step S16, it is checked if the last link heading is in the stable state for caution's sake, as in the case of the step S10. Then, the step S16 advances to step S17, in which the gyro integrated heading is compared with the link integrated heading. According to the result of the comparison, the counter C2 is increased and decreased. In step 18, an end link heading is stored.

As described above, the comparison of the gyro integrated heading with the link integrated heading is performed three times, that is, two times in the step S13 and one time in the step S17. Therefore, if the state of the gyro integrated heading > the link integrated heading continues three times, the counter C2 will be 3. If, on the other hand, the state of the gyro integrated heading < the link integrated heading continues three times, the counter C2 will be −3. If the state does not continue three times, the counter C2 will be any value between +2 and −2.

The evaluation of the geomagnetic heading will hereinafter be made in steps 20 through 35. This geomagnetic heading evaluation is substantially the same as the steps 2 through 18 of the link heading evaluation.

If the step S20, in which it is determined if a counter C3 is equal to zero. If it is determined that the gyro heading and the geomagnetic heading are in the stable state and the vehicle is in the straight traveling state, the counter C3 is incremented one by one each time the gyro heading data and the geomagnetic heading data are stored in the memory. If the counter C3 is equal to 0 (that is, the gyro heading and the geomagnetic heading have not been stored in the memory 123a), the step S20 advances to step S24, in which it is determined if the last gyro heading is in the stable state. In step S25, it is determined if the geomagnetic heading is in a normal state. If the radius of a geomagnetic heading circle is largely departed from a normal value, it is determined that the geomagnetic heading is not in the normal state. If the geomagnetic heading is in the normal state, the step S25 advances to step S26, in which it is determined if the last geomagnetic heading is in the stable state. More particularly, eight geomagnetic heading data are obtained and it is checked if a difference between the maximum and minimum values of the eight data is within a reference value. Only when the difference is within the reference value, the last geomagnetic heading is determined to be stable. With this, an adverse effect caused by an instantaneous fluctuation can be avoided. In step S27, the gyro heading data is stored as an initial gyro heading in the memory 123a and the geomagnetic heading data is stored as an initial geomagnetic heading in the memory 123a. The step S27 advances to step 42, in which the counter C3 is incremented by one.

If the counter value of the counter C3 is above 1, the step S20 advances to step S21. In the step S21, by integrating the output (i.e., angular velocity) of the gyro, a current gyro heading is obtained. Then, in step S23, an elapsed time t3 from the time that data were cleared in the step 41 is read out, and it is determined if the elapsed time $t1 \geq$ a predetermined time T3 (e.g., 100 seconds). If "NO", the step S23 advances to step S31.

After the "RETURN", it is again determined in the step S23 if $t3 \geq T3$. If YES, the step S23 advances to step S28, in which it is checked if the last geomagnetic heading is in the stable state for caution's sake, as in the case of the step S26. If the last geomagnetic heading is in the stable state, the step S28 advances to step S29, in which the gyro integrated heading is compared with the geomagnetic heading. According to the comparison result, the counter C4 is increased and decreased one by one. The step S29 advance to step S30, in which the time t3 is made zero. The step S30 then advances to step S31.

In the step S31, it is determined if an elapsed time t4 from the time the counter C2 was counted is above a predetermined time T4 (e.g., 350 seconds). If NO, the step S31 advances to the step S42, in which the counter C3 is incremented by 1. The reason why the time T4 is a little longer than the time T2 is that, when the link heading data and the geomagnetic heading data are collected in parallel, the offset correction is made with the link heading. This is because the offset correction by the link heading is more accurate. Therefore, the offset correction by the geomagnetic heading is made when the offset correction by the link heading cannot be made. That is, when there exist no matching state (e.g., mountain travel), the offset correction is made with the geomagnetic heading.

After the "RETURN", it is again determined in the step S23 if t3≧T3. If YES, the step S23 advances to the step S28, in which it is checked if the last geomagnetic heading is in the stable state for caution's sake, as in the case of the step S26. If the last geomagnetic heading is in the stable state, the step S28 advances to the step S29, in which the gyro integrated heading is compared with the geomagnetic heading. According to the comparison result, the counter C4 is increased and decreased one by one. The step S29 advance to the step S30, in which the time t3 is made zero. The step S30 then advances to the step S31.

In the step S31, the elapsed time t4 is checked. If t4≧T4, the step S31 advances to step S32 and step S33. In the step S32, it is checked if the last geomagnetic heading is in the normal state, as in the case of the step S25. In the step S33, it is checked if the last geomagnetic heading is in the stable state for caution's sake, as in the case of the step S26. In step S34, it is checked if the last gyro heading is in the stable state, as in the case of the step S24. Then, the step S34 advances to step S35, in which the gyro integrated heading is compared with the geomagnetic heading.

As described above, the comparison of the gyro integrated heading with the geomagnetic heading is performed three times, that is, two times in the step S29 and one time in the step S35.

The offset correction of the gyro will hereinafter be made in steps 36 through 39. In step 36, an amount of change in the offset is obtained by calculating a difference between the link or geomagnetic heading and the gyro heading.

In step 37, it is determined if the offset change amount is abnormally high. If not high, the step 37 advances to step S38, in which it is determined if the offset correction is made, on the basis of the result obtained in the steps S13 and S17 or the result obtained in the steps S29 and S35. The determination is made as follows. Only when the aforementioned counter C2 or C4 is 3 or −3, the offset correction is made. This is because the gyro heading, link heading, or geomagnetic heading is unstable when the aforementioned counter C2 or C4 is not 3 or −3. If it is determined that the offset correction is made, then the step S38 advances to step S39, in which the offset correction is made.

Thereafter, the data stored in the memory 123a are cleared in steps 40 and 41. The step 41 advances to the "RETURN".

As described above, the link heading is read three times out of the road map memory 125 in accordance with the present invention, when a vehicle continues to travel over the predetermined time T2. Only when all of the three link headings is larger or smaller than the gyro heading, a heading change amount in the time interval of T2 is detected on the basis of the last link heading. Also, another heading change amount is detected by integrating the output of the gyro 121 obtained after offset correction. Based on the two heading change amounts, an offset drift amount is obtained. Then, an offset value is corrected with this offset drift amount. Therefore, even if a vehicle continues to travel for a long period of time, the offset value can be corrected during traveling. For example, even if a vehicle is traveling a freeway, a large error can be prevented from occurring in the heading of the vehicle detected based on the output of the gyro 121. With this accurate heading, the location of a vehicle can be detected accurately, and the heading and current location of the vehicle can be displayed accurately in the display 127.

When the matching state does not exist and the vehicle continues to travel over the time T4 (T4>T2), the geomagnetic heading is read three times out of the road map memory 125, and a heading change amount during the time T4 is detected with the three geomagnetic headings. At the same time, a heading change amount is obtained by integrating the output of the gyro 121 obtained after the offset correction. Based on the two heading change amounts, an offset drift amount is obtained. Then, an offset value is corrected with this offset drift amount. Thus, even if a vehicle is not in the matching state, the offset value can be corrected during traveling, and a large error can be prevented from occurring in the heading of the vehicle detected based on the output of the gyro 121.

It is noted that, in some cases, if the stop time of a vehicle is short, the offset value is not corrected on the basis of the gyro output obtained during the stop. Therefore, it can be determined in the step S1 of FIG. 12 if an offset value is corrected on the basis of the gyro output obtained during stop.

As described above, in a case where a vehicle continues to travel over a long period of time or a vehicle is not in a matching state, the offset variation contained in the gyro output can be detected, and the offset value can be corrected to an accurate offset value, in accordance with the present invention.

While the subjection invention has been described with relation to the preferred embodiments, various modifications and adaptations thereof will now be apparent to those skilled in the art. All such modifications and adaptations as fall within the scope of the appended claims are intended to be covered thereby.

What I claim is:

1. In a heading detecting method in which an offset contained in an output of a turning angular velocity sensor for sensing an turning angular velocity of a moving body is corrected and a heading of the moving body is detected on the basis of the output of the turning angular velocity sensor obtained after this offset correction, said method comprising the steps of:

detecting a current location of said moving body;

calculating a correlation between a track of the detected current location and a link corresponding to a path that said moving body may travel and determining said correlation as a matching state when said correlation is in a predetermined correlation;

if said matching state is determined, storing a link heading of a link corresponding to said detected current location as a first heading;

determining if said moving body continues to travel over a predetermined time after said first heading has been stored;

if it is determined that said moving body continues to travel over said predetermined time and that said correlation is in said matching state over said predetermined time, storing a link heading of a link corresponding to a current location of said moving body at that time, as a second heading;

calculating a first heading change amount from said first and second headings;

detecting as a second heading change amount an accumulated value of outputs of said turning angular velocity sensor that are obtained during a period corresponding to the first heading change amount after said offset correction; and updating an offset value for said offset correction on the basis of said first and second heading change amounts.

2. A method as set forth in claim 1, wherein, when said moving body is stopped, said offset value is updated on the basis of an output of said turning angular velocity sensor that is obtained during stop after said offset correction.

3. In a heading detecting method in which an offset contained in an output of a turning angular velocity sensor for sensing an turning angular velocity of a moving body is corrected and a heading of the moving body is detected on the basis of the output of the turning angular velocity sensor obtained after this offset correction, said method comprising the steps of:

detecting a current location of said moving body;

calculating a correlation between a track of the detected current location and a link corresponding to a path that said moving body may travel and determining said correlation as a matching state when said correlation is in a predetermined correlation;

if said matching state is determined, storing a link heading of a link corresponding to said detected current location as a first heading;

determining if said moving body continues to travel over a predetermined time after said first heading has been stored;

if it is determined that said moving body continues to travel over said predetermined time and that said correlation is in said matching state over said predetermined time, storing a link heading of a link corresponding to a current location of said moving body at that time, as a second heading;

calculating a first heading change amount from said first and second headings;

detecting as a second heading change amount an accumulated value of outputs of said turning angular velocity sensor that are obtained during a period corresponding to the first heading change amount before said offset correction; and updating an offset value for said offset correction on the basis of said first and second heading change amounts.

4. A method as set forth in claim 3, wherein, when said moving body is stopped, said offset value is updated on the basis of an output of said turning angular velocity sensor that is obtained during stop before said offset correction.

5. In a heading detecting apparatus which includes a turning angular velocity sensor for sensing an turning angular velocity of a moving body and correction means for correcting an offset contained in an output of the turning angular velocity and in which a heading of the moving body is detected on the basis of an output of the correction means, said apparatus comprising:

a map memory for storing links that are interconnected by nodes representative of predetermined coordinate positions on a map and correspond to paths that said moving body may travel and for storing link headings that are headings of said moving body traveling along said links;

location detecting means for detecting a current location of said moving body;

first determination means that calculates a correlation between a track of the detected current location and one of said links stored in said map memory and determines said correlation as a matching state when said correlation is in said predetermined correlation;

first storing means for storing as a first heading the link heading of the link corresponding to a current location of said moving body as said matching state is determined;

second determination means for determining if said moving body continues to travel over a predetermined time after said first heading has been stored;

second storing means for storing as a second heading the link heading of the link corresponding to a current location of said moving body detected at the time that it is determined that said moving body continues to travel over said predetermined time and also at the time that it is determined that said correlation is in said matching state over said predetermined time;

first detecting means for detecting a first heading change amount from said first and second headings;

second detecting means for detecting as a second heading change amount an accumulated value of outputs of said correction means that are obtained during a period corresponding to the first heading change amount detected by said first detecting means; and offset updating means for updating an offset value that is a correction value of said offset correction means, on the basis of said first and second heading change amounts.

6. An apparatus as set forth in claim 5, wherein, when said moving body is stopped, said offset value is updated on the basis of an output of said turning angular velocity sensor that is obtained before said output is offset corrected.

7. An apparatus as set forth in claim 5, wherein, when said moving body is stopped, said offset value is updated on the basis of an output of said correction means that is obtained during the stop.

8. In a heading detecting apparatus which includes a turning angular velocity sensor for sensing an turning angular velocity of a moving body and correction means for correcting an offset contained in an output of the turning angular velocity and in which a heading of the moving body is detected on the basis of an output of the correction means, said apparatus comprising:

a map memory for storing links that are interconnected by nodes representative of predetermined coordinate positions on a map and correspond to paths that said moving body may travel and for storing link headings that are headings of said moving body traveling along said links;

location detecting means for detecting a current location of said moving body;

first determination means that calculates a correlation between a track of the detected current location and one of said links stored in said map memory and determines said correlation as a matching state when said correlation is in said predetermined correlation;

first storing means for storing as a first heading the link heading of the link corresponding to a current location of said moving body as said matching state is determined;

second determination means for determining if said moving body continues to travel over a predetermined time after said first heading has been stored;

second storing means for storing as a second heading the link heading of the link corresponding to a current location of said moving body detected at the time that it is determined that said moving body continues to travel over said predetermined time and also at the time that it is determined that said correlation is in said matching state over said predetermined time;

first detecting means for detecting a first heading change amount from said first and second headings;

second detecting means for detecting as a second heading change amount an accumulated value of outputs of said turning angular velocity sensor that are obtained before they are offset corrected; and offset updating means for updating an offset value that is a correction value of said offset correction means, on the basis of said first and second heading change amounts.

9. An apparatus as set forth in claim 8, wherein, when said moving body is stopped, said offset value is updated on the basis of an output of said turning angular velocity sensor that is obtained before said output is offset corrected.

10. An apparatus as set forth in claim 8, wherein, when said moving body is stopped, said offset value is updated on the basis of an output of said correction means that is obtained during the stop.

11. A method of correcting an offset contained in an output of a gyro for sensing a turning angular velocity of a vehicle, comprising the steps of:

detecting a current location of the vehicle;

calculating a correlation between a track of the detected current location and a link corresponding to a path that said moving body may travel;

determining that said correlation is in a matching state, when said correlation is in a predetermined correlation;

determining that said correlation is not in said matching state, when said correlation is not in said predetermined correlation;

if it is determined that said correlation is in said matching, detecting as a first heading change amount an amount of change of a link heading as it is determined that said vehicle continues to travel over a predetermined period of time, that said correlation is always in said matching over said predetermined period of time and also that said vehicle is in a traveling state at start and end points of said predetermined period of time, detecting as a second heading change an accumulated value of outputs of the gyro obtained for a period of time corresponding to said first heading change amount, and correcting said offset on the basis of comparison of said first and second heading change amounts; and if it is determined that said correlation is not in said matching, detecting as a third heading change amount an amount of change of a geomagnetic heading as it is determined that said vehicle continues to travel over said predetermined period of time and that said vehicle is in a traveling state at said start and end points of said predetermined period of time, detecting as a fourth heading change an accumulated value of outputs of the gyro obtained for a period of time corresponding to said third heading change amount, and correcting said offset on the basis of comparison of said third and fourth heading change amounts.

12. An apparatus for correcting an offset value contained in an output of a gyro for sensing a turning angular velocity of a vehicle, comprising:

a map memory for storing links that are interconnected by nodes representative of predetermined coordinate positions on a map and correspond to paths that said vehicle may travel and for storing link headings that are headings of said vehicle traveling along said links;

location detecting means for detecting a current location of said vehicle;

matching determination means that calculates a correlation between a track of the detected current location and one of said links stored in said map memory and determines said correlation as a matching state when said correlation is in said predetermined correlation;

initial-link-heading storing means for storing as an initial link heading the link heading of the link corresponding to a current location of said vehicle as said matching state is determined;

end-link-heading storing means for storing as an end link heading the link heading of the link corresponding to a current location of said vehicle as said vehicle is in a straight traveling state and as it is determined that said vehicle continues to travel over a predetermined period of time and that said correlation is always in said matching over said predetermined period of time, after said initial link heading was stored;

first detecting means for detecting a first heading change amount from said initial link heading and said end link headings;

second detecting means for detecting as a second heading change amount an accumulated value of outputs of said gyro that are obtained a period corresponding to said first link change amount;

offset correcting means for correcting said offset value on the basis of said first and second heading change amounts;

initial-geomagnetic-heading storing means for storing as an initial geomagnetic heading a geomagnetic heading corresponding to a current location of said vehicle as it is determined that said correlation is not in said matching state and as said vehicle is in said straight traveling state;

end-geomagnetic-heading storing means for storing as an end geomagnetic heading the link heading of the link corresponding to a current location of said vehicle as said vehicle is in said straight traveling state and as it is determined that said vehicle continues to travel over said predetermined period of time, after said initial geomagnetic heading was stored;

third detecting means for detecting a third heading change amount from said initial geomagnetic heading and said end geomagnetic headings;

fourth detecting means for detecting as a fourth heading change amount an accumulated value of outputs of said gyro that are obtained a period corresponding to said third link change amount; and offset correcting means for correcting said offset value on the basis of said third and fourth heading change amounts.

* * * * *